United States Patent
Kurata et al.

(10) Patent No.: US 9,812,122 B2
(45) Date of Patent: Nov. 7, 2017

(54) SPEECH RECOGNITION MODEL CONSTRUCTION METHOD, SPEECH RECOGNITION METHOD, COMPUTER SYSTEM, SPEECH RECOGNITION APPARATUS, PROGRAM, AND RECORDING MEDIUM

(71) Applicant: INTERNATIONAL BUSINESS MACHINES CORPORATION, Armonk, NY (US)

(72) Inventors: Gakuto Kurata, Tokyo (JP); Toru Nagano, Tokyo (JP); Masayuki Suzuki, Tokyo (JP); Ryuki Tachibana, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/863,124

(22) Filed: Sep. 23, 2015

(65) Prior Publication Data

US 2016/0086599 A1 Mar. 24, 2016

(30) Foreign Application Priority Data

Sep. 24, 2014 (JP) ................................. 2014-193564

(51) Int. Cl.
*G10L 15/00* (2013.01)
*G10L 15/06* (2013.01)
(Continued)

(52) U.S. Cl.
CPC .......... *G10L 15/063* (2013.01); *G10L 15/187* (2013.01); *G10L 15/19* (2013.01); *G10L 13/00* (2013.01)

(58) Field of Classification Search
USPC .......................... 704/243, 246, 247, 251, 252
See application file for complete search history.

(56) References Cited

U.S. PATENT DOCUMENTS

| 7,668,718 B2 * | 2/2010 | Kahn | G10L 15/063 704/270 |
| 2002/0169604 A1 * | 11/2002 | Damiba | G10L 15/183 704/231 |

(Continued)

FOREIGN PATENT DOCUMENTS

| JP | 2004145161 A | 5/2004 |
| JP | 2008309856 A | 12/2008 |

(Continued)

OTHER PUBLICATIONS

Kumatani, K. et al., "Joint Constrained Maximum Likelihood Regression for Overlapping Speech Recognition," IEEE International Conference on Acoustics, Speech and Signal Processing, May 2013. (pp. 1-5).

(Continued)

*Primary Examiner* — Leonard Saint Cyr
(74) *Attorney, Agent, or Firm* — Tutunjian & Bitetto, P.C.; David Quinn

(57) ABSTRACT

A construction method for a speech recognition model, in which a computer system includes; a step of acquiring alignment between speech of each of a plurality of speakers and a transcript of the speaker; a step of joining transcripts of the respective ones of the plurality of speakers along a time axis, creating a transcript of speech of mixed speakers obtained from synthesized speech of the speakers, and replacing predetermined transcribed portions of the plurality of speakers overlapping on the time axis with a unit which represents a simultaneous speech segment; and a step of constructing at least one of an acoustic model and a language model which make up a speech recognition model, based on the transcript of the speech of the mixed speakers.

19 Claims, 14 Drawing Sheets

(51) Int. Cl.
*G10L 15/187* (2013.01)
*G10L 15/19* (2013.01)
*G10L 13/00* (2006.01)

(56) References Cited

U.S. PATENT DOCUMENTS

| | | | | |
|---|---|---|---|---|
| 2005/0027527 A1* | 2/2005 | Junkawitsch | ........... | G10L 15/20 704/243 |
| 2006/0149558 A1* | 7/2006 | Kahn | .................... | G10L 15/063 704/278 |
| 2008/0270136 A1* | 10/2008 | Deligne | .................. | G10L 15/19 704/257 |
| 2009/0240499 A1* | 9/2009 | Dvir | ....................... | G10L 15/063 704/246 |
| 2013/0158997 A1* | 6/2013 | Natarajan | ............... | G06F 17/10 704/240 |

FOREIGN PATENT DOCUMENTS

| | | |
|---|---|---|
| JP | 2009020461 A | 1/2009 |
| JP | 2011154099 A | 8/2011 |
| WO | WO2004075168 A1 | 9/2004 |

OTHER PUBLICATIONS

Boakye, K. et al., "Overlapped Speech Detection for Improved Speaker Diarization in Multiparty Meetings," IEEE International Conference on Acoustics, Speech and Signal Processing, Apr. 2008. (pp. 1-4).

Sarosi, G. et al., "On Modeling Non-word Events in Large Vocabulary Continuous Speech Recognition," IEEE International Conference on Cognitive Infocommunications, Dec. 2012. (pp. 1-5).

* cited by examiner

SPEECH RECOGNITION MODEL CONSTRUCTION METHOD, SPEECH RECOGNITION METHOD, COMPUTER SYSTEM, SPEECH RECOGNITION APPARATUS, PROGRAM, AND RECORDING MEDIUM

BACKGROUND

Technical Field

The present invention relates to a speech recognition model construction method, speech recognition method, computer system, speech recognition apparatus, program, and recording medium, and, more particularly, to a construction method, computer system, program, and recording medium for constructing a speech recognition model for mixed speech of mixed speakers, as well as to a speech recognition method, speech recognition apparatus, and program which use the constructed speech recognition model.

Description of Related Art

Conventionally, in call recording at call centers and the like, although stereo recording is also used to record outgoing speech and incoming speech on separate channels, monaural recording is often used to record outgoing speech and incoming speech in a mixed state from the viewpoint of data volume.

However, it is known that speech recognition of monaural sound is inferior in accuracy to stereo sound. A cause of this is that speech recognition fails in and around a portion where utterances of plural speakers overlap (simultaneous speech segment). Some speech recognition such as large vocabulary continuous speech recognition improves recognition accuracy by utilizing connections among words. However, if, for example, misrecognition occurs in a portion where utterances overlap, recognition results of preceding and following portions will be affected, which could result in a burst error.

Additionally, a manual transcript of utterance content in stereo sound is relatively usable. However, in the case of monaural sound, manual labor cost of labeling simultaneous speech segments and utterance content is very high, and thus it is difficult to obtain sufficient quantity of correct labeled data for training.

Against this background, there is demand for development of a technique which can efficiently train a speech recognition model capable of discriminating simultaneous speech segments in monaural sound with high accuracy.

A number of speech recognition techniques are known hitherto. For example, WO2004/075168A1 (Patent Literature 1) discloses a speech recognition technique which uses a garbage acoustic model, which is an acoustic model trained from a set of unnecessary words. JP2011-154099A (Patent Literature 2) discloses a configuration in which a language model is created by modeling unexpected sentences, a dictionary is created with unexpected words registered therein, and unexpected utterances are discarded to reduce the rate of malfunctions. Non-Patent Literature 1 discloses a speech recognition technique for modeling extraneous sounds of noises, such as breath and coughs, as garbage models. Additionally, a diarization technique is known which relates to meeting diarization and divides speech into non-speech segments, speech segments, and overlapped speech segments (Non Patent Literature 2).

However, none of the conventional speech recognition techniques in Patent Literature 1, Patent Literature 2, and non-Patent Literature 1 take simultaneous speech segments into consideration. Although the conventional technique in Patent Literature 1 involves dividing speech into non-speech segments, speech segments, and overlapped speech segments, the technique concerns meeting diarization and it is difficult to apply the technique directly to speech recognition. Therefore, there is still demand for development of a technique which can efficiently train a speech recognition model capable of discriminating simultaneous speech segments in mixed speakers' speech in monaural sound and the like with high accuracy.

Patent Literature 1: WO2004/075168A1.

Patent Literature 2: JP2011-154099A.

Non-patent Literature 1: G. Sarosi, et al., "On Modeling Non-word Events in Large Vocabulary Continuous Speech Recognition", Cognitive Infocommunications (CogInfoCom) 2012 IEEE 3rd International Conference, 649-653, Dec. 2-5, 2012, Kosice, Slovakia.

Non-patent Literature 2: K. Boakye, et al., "Overlapped speech detection for improved speaker diarization in multi-party meetings", Proceedings of the IEEE International Conference on Acoustics, Speech, and Signal Processing (ICASSP 2008), 4353-4356, Mar. 31 2008-Apr. 4 2008, Las Vegas, Nev., USA.

SUMMARY

The present invention has been made in view of the inadequacies of the conventional techniques described above and has an object to provide a construction method, computer system, program, and recording medium which can efficiently construct a speech recognition model capable of discriminating simultaneous speech segments in mixed speakers' speech in which voices of plural speakers are mixed. Another object of the present invention is to provide a speech recognition method, speech recognition apparatus, and program which use the speech recognition model capable of discriminating simultaneous speech segments in mixed speakers' speech.

To solve the above problems, the present invention provides a speech recognition model construction method having features which are described as follows. The construction method comprises the steps, executed by a computer system, of: acquiring alignment between speech of each of a plurality of speakers and a transcript of the speaker; joining transcripts of the respective ones of the plurality of speakers along a time axis, creating a transcript of mixed speakers' speech obtained from synthesized speech of the speakers, and replacing predetermined transcribed portions of the plurality of speakers overlapping on the time axis with a unit which represents a simultaneous speech segment; and constructing at least one of an acoustic model and a language model which make up a speech recognition model, based on the transcript of the mixed speakers' speech.

Additionally, the present invention can provide a computer system for constructing a speech recognition model. The computer system comprises an alignment acquisition section adapted to acquire alignment between speech of each of a plurality of speakers and a transcript of the speaker; a speech synthesizing section adapted to combine the speech of the speakers and thereby generate mixed speakers' speech; a transcription section adapted to join the transcripts of the respective ones of the plurality of speakers along a time axis, create a transcript of mixed speakers' speech, and replace predetermined transcribed portions overlapping among plural speakers on the time axis with a unit which represents a simultaneous speech segment; a language model construction section adapted to construct a language model making up a speech recognition model; and an acoustic model construction section adapted to construct an acoustic model making up the speech recognition model, based on the mixed speakers' speech as well as on the transcript of the mixed speakers' speech.

Furthermore, the present invention can provide a program product for constructing a speech recognition model, wherein the program product causes a computer to function as the sections described above. Furthermore, the present invention can provide a recording medium adapted to store the program product in a computer-readable manner.

Furthermore, the present invention can provide a speech recognition method for outputting speech recognition results while discriminating a simultaneous speech segment in input speech based on the constructed speech recognition model. Furthermore, the present invention can provide a speech recognition apparatus for performing speech recognition based on a speech recognition model, comprising: the constructed speech recognition model; an input section adapted to accept input of speech to be recognized; and a speech recognition section adapted to output recognition results while discriminating a simultaneous speech segment in the speech to be recognized, based on the speech recognition model. Furthermore, the present invention can provide a program product for outputting speech recognition results while discriminating a simultaneous speech segment in input speech based on the speech recognition model.

Additionally, the present invention can further provide a speech recognition apparatus comprising: a language model configured to make up the speech recognition model, contain a language unit representing a simultaneous speech segment, and model the probability of outputting a chain of language units including a language unit which represents the simultaneous speech segment; an acoustic model configured to make up the speech recognition model, contain an acoustic unit associated with the language unit which represents the simultaneous speech segment and configured to represent the simultaneous speech segment, and model the probability of outputting predetermined speech on condition that the language unit representing the simultaneous speech segment is given; an input section adapted to accept input of speech to be recognized; and a speech recognition section adapted to output recognition results while discriminating a simultaneous speech segment in the speech to be recognized, based on the speech recognition model.

The above configuration makes it possible to efficiently construct a speech recognition model capable of discriminating simultaneous speech segments in mixed speakers' speech.

DETAILED DESCRIPTION

An embodiment of the present invention will be described below, but embodiments of the present invention are not limited to the embodiment described below. Note that in the embodiment described below, a speech recognition system 100 and a speech recognition model construction method performed by the speech recognition system 100 will be described as an example of a computer system and construction method for constructing a speech recognition model. Also, the speech recognition system 100 according to the described embodiment implements a speech recognition method based on the constructed speech recognition model and is configured also as a speech recognition apparatus.

Figure 1:
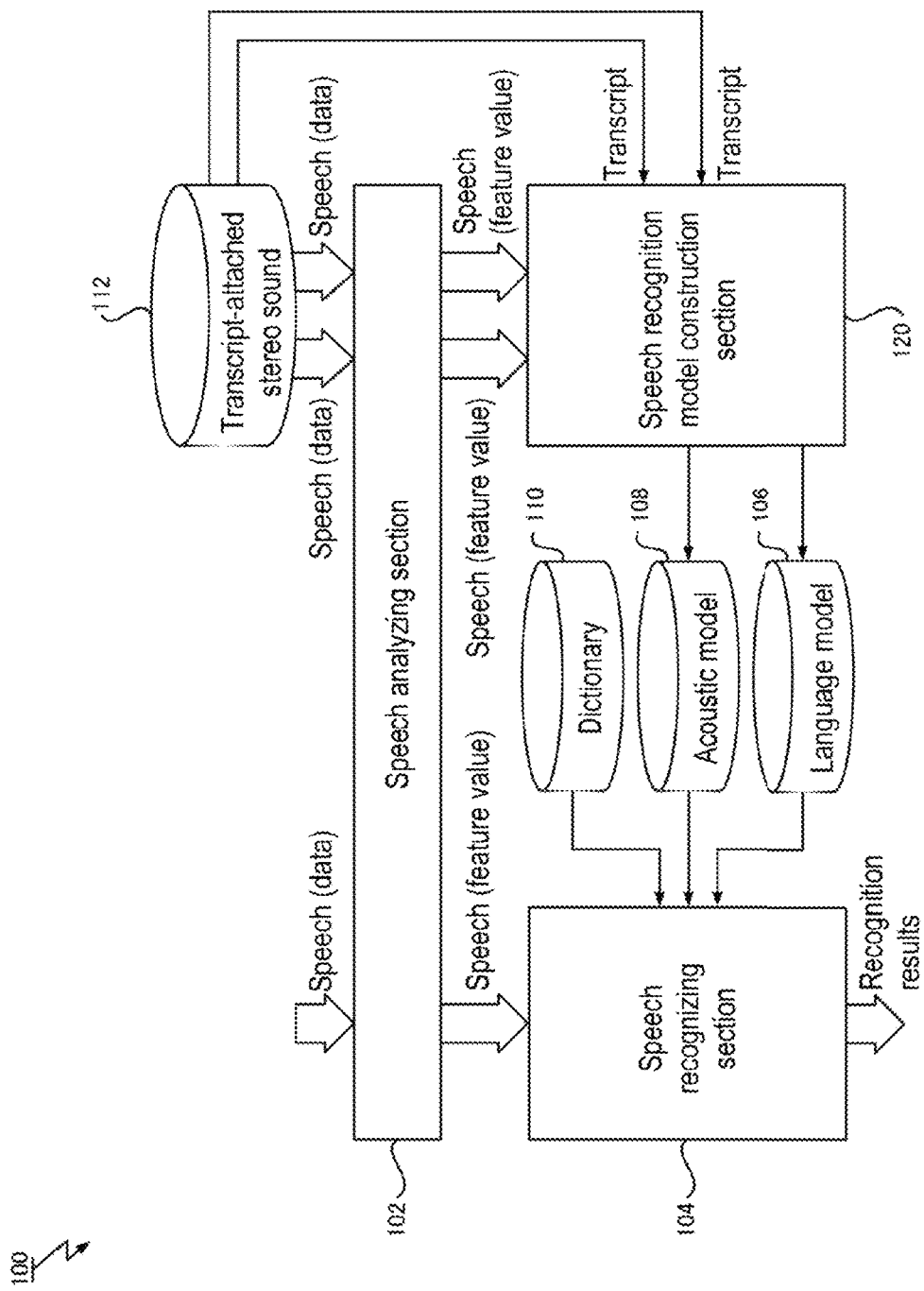
FIG. 1 is a block diagram showing a configuration of an exemplary speech recognition system according to an embodiment of the present invention.

FIG. 1 is a block diagram showing a configuration of the speech recognition system 100 according to the embodiment of the present invention. As shown in FIG. 1, the speech recognition system 100 includes a speech analyzing section 102 adapted to accept input of speech data, a speech recognizing section 104 adapted to output recognition results from speech analysis results based on a speech recognition model, and a speech recognition model construction section 120 adapted to construct the speech recognition model based on training data.

The speech analyzing section 102 accepts input of speech data obtained, for example, by sampling an analog sound signal collected by a microphone, at a predetermined sampling frequency and with predetermined bit depth and converting the signal into digital form. The speech analyzing section 102 extracts feature values of speech from inputted speech data by taking into consideration voice characteristics originating in a human vocal mechanism as well as human auditory characteristics and outputs a time series of speech feature values. Also, speech interval detection may be performed to detect utterance interval in input speech as a preliminary process. Note that the input form of the speech data is not particularly limited, and the speech data may be inputted as a speech file, inputted directly through a recording device such as a microphone, or inputted via a network socket.

The speech recognizing section 104 estimates the most likely utterance content from the time series of feature values of inputted speech based on the speech recognition model and outputs recognition results. In the described embodiment, the speech recognition model includes a language model 106, an acoustic model 108, and a dictionary 110. First, the speech recognition model will be outlined.

Now, time series feature values of speech, which result when speech data is configured as a time series of feature values, will be expressed as $X=\{x_t\}$. The speech analyzing section 102 performs speech analysis using a time window and frame period of predetermined lengths, where t $(=1, \ldots, T)$ is an index of frames corresponding to the time windows and $x_t$ is a feature vector of predetermined dimensions in frame t. Also, T is the total number of frames in the speech data.

Although the features of speech are not particularly limited, examples include the Mel frequency cepstral coefficient (MFCC), LPC (Linear Predictive Coding) cepstral coefficient, and PLP (Perceptual Linear Prediction) cepstral coefficient. The extracted feature values make up feature vectors of predetermined dimensions on a frame by frame basis. The feature values of speech may further include dynamic feature values such as a Δ feature value obtained by causing the feature values of a few successive frames to recur in a time direction and a ΔΔ feature value which is Δ of the Δ feature value.

The speech recognition process is equivalent to the process of estimating that which most likely corresponds to the word sequence $\hat{W}=\{\hat{w}_i\}$ from time series feature values X of speech, where i $(=1, \ldots, I)$ is an index used to discriminate a word in the most likely word sequence, $\hat{w}_i$ is the ith word in the word sequence, and I is the number of words contained in the word sequence.

In finding a solution in a statistical framework, speech recognition is formulated as the problem of finding $\mathrm{argmax}_W\ p(W|X)$ and can be transformed as follows based on Bayes' theorem. In the formula below, p(W|X) represents the probability of a label column W being given when the time series feature values X are given. Post-transformation p(W|X) represents the probability of the time series feature values X being generated when the label column W is given, where p(W) represents a preliminary distribution of the label column W.

$$\hat{W} = \underset{W}{\mathrm{argmax}}\, p(W|X) = \underset{W}{\mathrm{argmax}}\, \log p(X|W) + \log p(W) \quad \text{Expression 1}$$

The language model 106 described above is used to calculate log p(W) in the above formula and gives the likelihood of a chain of predetermined language units such as words. Although the language model 106 is not particularly limited, an n-gram model or a model based on a neural network can be used suitably.

The acoustic model 108 described above is used to calculate log p(X|W) in the above formula and gives likelihood by collating with input while holding a standard feature pattern in predetermined acoustic units such as phonemes. Although the acoustic model 108 is not particularly limited, suitable examples include an HMM-GMM system which is a hidden Markov model (HMM) using a Gaussian mixture model (GMM) as an output distribution, and an HMM-DNN system using DNN (Deep Neural Network) instead of GMM in the HMM-GMM system.

Typically, the language model 106 is built in word units while the acoustic model 108 is built in phoneme units. The dictionary 110 holds a set of the words to be recognized and describes each word and correspondence between each word and a phoneme sequence. Note that although in terms of a linguistic unit, the language model 106 is built in units of words in the described embodiment, this does not preclude the use of other units such as character units, syllable units, clause units, or class units. Also, although in terms of an acoustic unit, the acoustic model 108 is built in units of phonemes in the described embodiment. Other units such as word units or syllable units may be used.

The speech recognizing section 104 is a functional part adapted to integrate the language model 106 and acoustic model 108 and search for the most likely word sequence and is referred to as a decoder or speech recognition engine. The speech recognizing section 104 can subject the sound on each channel of stereo sound or monaural sound to speech recognition. Based on the time series feature values X of inputted speech, the speech recognizing section 104 determines the word sequence $\hat{W}$ which maximizes a predetermined objective function and outputs speech recognition results.

The speech recognition model construction section 120 constructs the language model 106 and acoustic model 108 described above by training given training data. In the present embodiment, transcript-attached stereo sound 112 is provided as training data. The transcript-attached stereo sound 112 is speech data of a two-person conversation with a channel provided for each speaker and a transcript (text) attached to each speaker's channel. The transcripts are typically written by hand, but this does not preclude transcripts given automatically by a machine.

The speech recognition model construction section 120 trains the language model 106 and acoustic model 108 of the speech recognition model using a set of a feature value time series of speech on each channel and a transcript of each channel as training data, where the feature value time series of the speech on each channel is obtained through speech analysis of speech data on each channel of the transcript-attached stereo sound 112 while the transcript of each channel is given as a correct label.

As described above, it is known that speech recognition of monaural sound is inferior in accuracy to stereo sound. First, this is because utterances can overlap in a conversation among plural speakers and, in the monaural sound, recognition errors are prone to occur in the portions where utterances overlap. Furthermore, speech recognition such as large vocabulary continuous speech recognition improves recognition accuracy by utilizing connections among words, and if misrecognition occurs in a portion where utterances overlap, recognition results of preceding and following portions will be affected as well, which could result in a burst error. Also, in the case of monaural sound, manual labor cost of labeling simultaneous speech segments and utterance content is very high, and thus it is more difficult to obtain sufficient quantity of correct labeled data for training than in the case of stereo sound.

Thus, the speech recognition system 100 according to the embodiment of the present invention constructs a speech recognition model which also supports monaural sound, using the transcript-attached stereo sound 112 as training data.

More specifically, the speech recognition system 100 according to the embodiment of the present invention acquires alignment between each speaker's speech on the transcript-attached stereo sound 112 and each speaker's transcript, joins the transcripts of the respective speakers along a time axis, and creates a transcript of monaural sound. In so doing, predetermined transcribed portions of plural speakers overlapping on the time axis are replaced with a unit which represents a simultaneous speech segment. Then, at least one of the language model 106 and acoustic model 108 making up the speech recognition model is constructed based on the transcript of the monaural sound. Consequently, even in the case of multi-speaker monaural sound in which simultaneous speech can occur, speech recognition can be performed while discriminating simultaneous speech segments. In particular, since simultaneous speech segments are predicted linguistically, the occurrence of burst errors is reduced, eventually improving the accuracy of speech recognition.

Note that, in the present embodiment, the sound on each channel of stereo sound is recorded by separating the voice of one speaker from the voice of another speaker in a conversation and makes up a separated speaker's voice in the present embodiment. On the other hand, monaural sound is recorded by mixing voices of plural speakers in a conversation and makes up mixed speakers' speech in the present embodiment.

Furthermore, an embodiment described below concerns a two-person conversation, and stereo sound will be described assuming that an L channel contains voice of one of the speakers while an R channel contains voice of the other speaker. However, the voice which can be used for training is not limited to this. In another embodiment, the separated speaker's voice of each speaker in a conversation among three or more speakers can be used as training data. Similarly, description will be given using monaural sound resulting from mixed voices of plural speakers in a two-person conversation, but the speech to be recognized is not limited to this. Naturally, monaural sound of a single speaker or sound on each channel of stereo sound can be subjected to recognition. Also, cases in which mixed speakers' speech in a conversation among three or more speakers is subjected to recognition is not precluded in another embodiment.

A speech recognition model construction process according to the embodiment of the present invention will be described in more detail below with reference to FIGS. 2 to 13.

Figure 2:
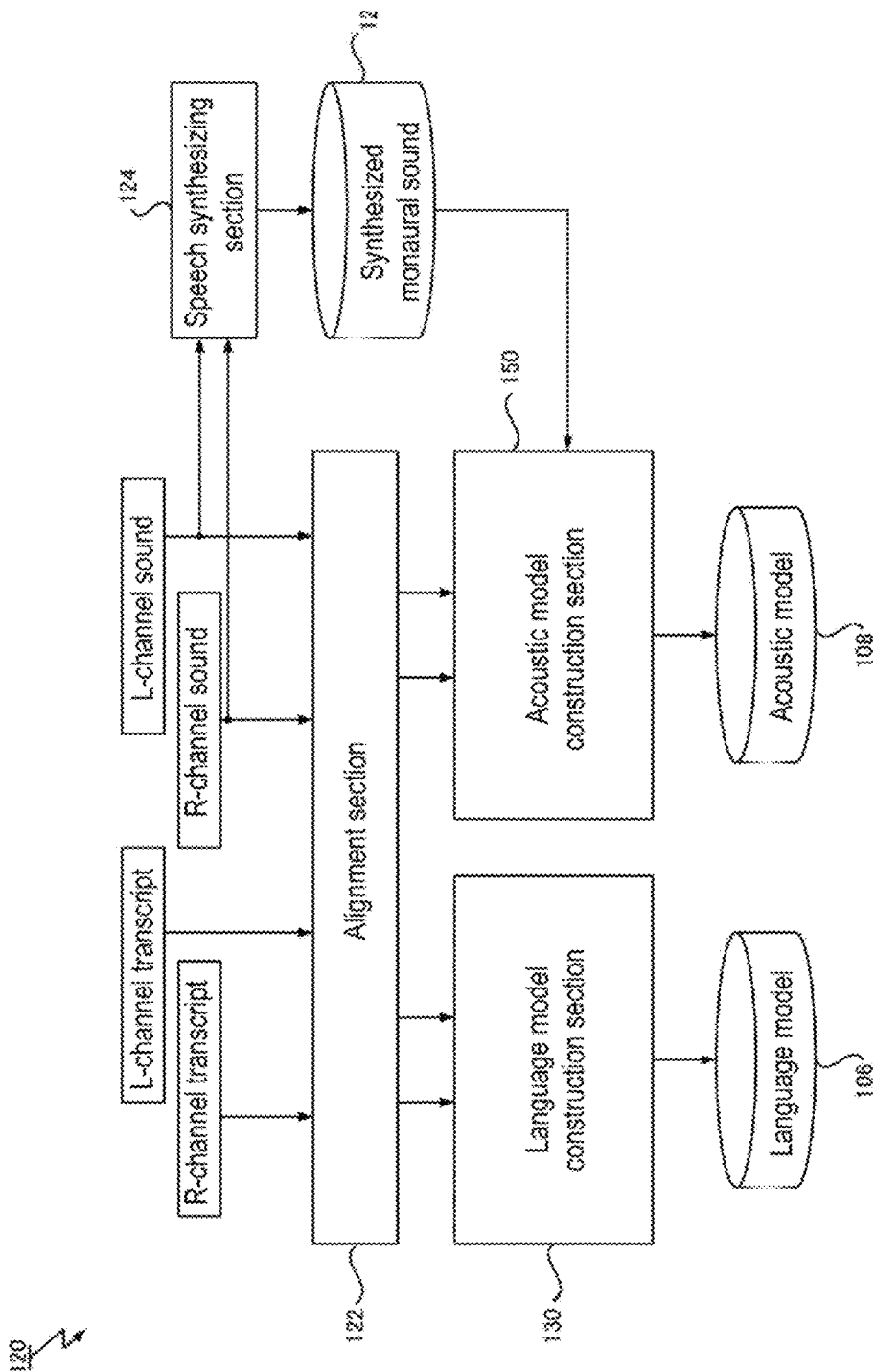
FIG. 2 is a detailed block diagram showing a speech recognition model construction section of the speech recognition system according to the embodiment of the present invention.

FIG. 2 is a detailed block diagram showing the speech recognition model construction section 120 of the speech recognition system 100 according to the embodiment of the present invention. As shown in FIG. 2, the speech recognition model construction section 120 includes an alignment section 122, a speech synthesizing section 124, a language model construction section 130, and an acoustic model construction section 150.

The alignment section 122 acquires a temporal alignment between the speech (time series feature values of speech) on each channel of the transcript-attached stereo sound 112 and the transcript (text) of each channel. To acquire the temporal alignment, the alignment section 122 can use a technique known as forced alignment. The alignment section 122 makes up an alignment acquisition section in the present embodiment.

Figure 3:
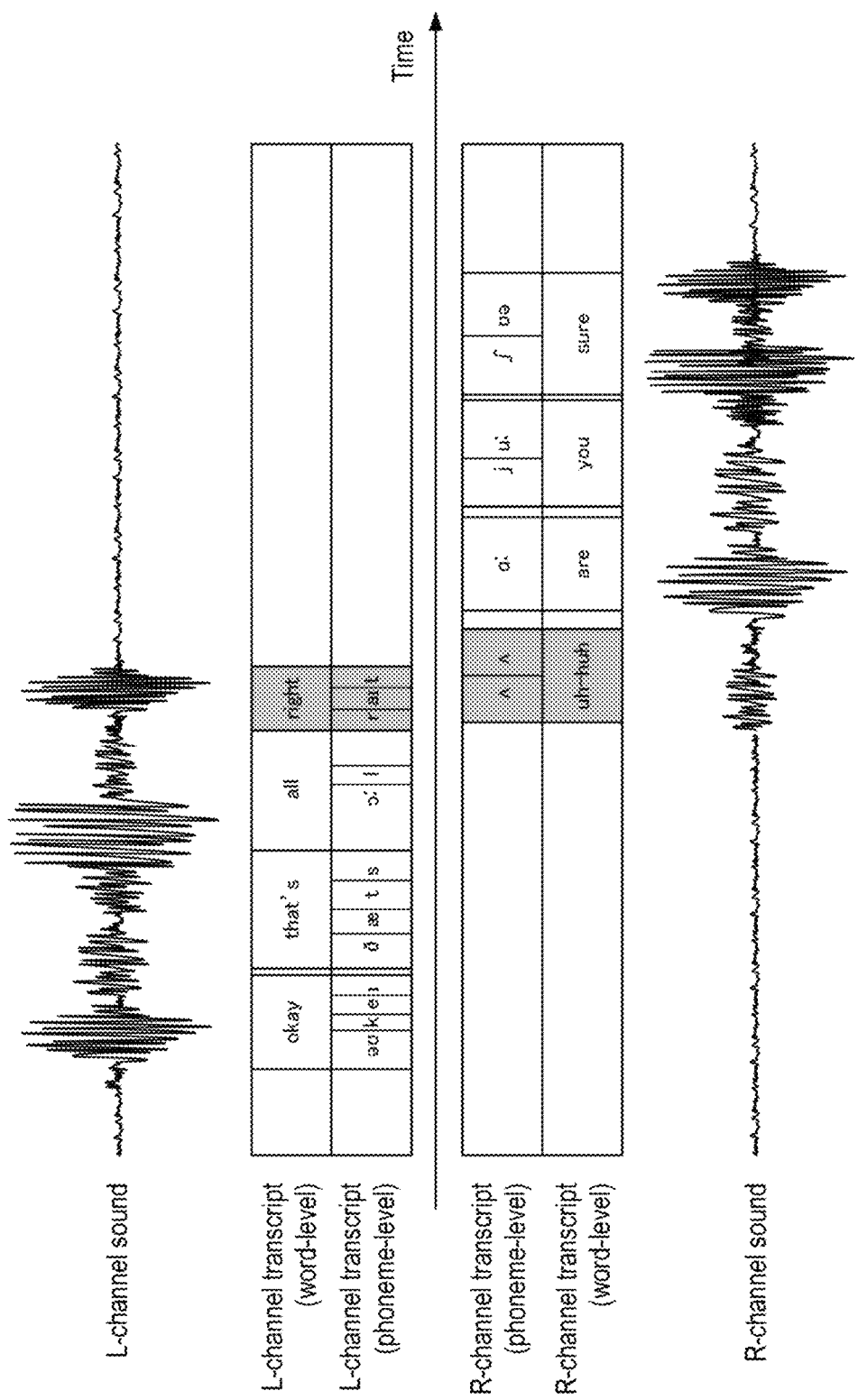
FIG. 3 is a diagram showing an alignment process performed by an alignment section, according to the embodiment of the present invention, to align transcripts (in English)

FIG. 3 is a diagram showing an alignment process performed by the alignment section 122 according to the embodiment of the present invention to align transcripts. FIG. 3 shows schematic speech waveforms on the L channel and R channel and transcripts of the L channel and R channel. Note that the speech waveforms and word-level and phoneme-level transcripts are shown schematically for convenience of explanation and that FIG. 3 does not show an accurate correspondence speech waveforms and transcripts. Note also that speech has been transformed into a time series of feature vectors of a predetermined frame period by the speech analyzing section 102, but is shown by being associated with speech waveforms here for convenience of explanation.

The transcripts of the transcript-attached stereo sound 112 is sometimes provided in the form of text. In that case, the text is divided into words, based on morphological analysis in the case of Japanese or based on delimiting spaces in the case of English. Also, in the case of Japanese, the text can be divided in word units and hierarchically further in phoneme units using a kana-phoneme correspondence table based on a pronunciation form (kana) of each word in a dictionary. The same is true when the language is English. Alternatively, a word sequence or a phoneme sequence may be provides as a transcript from the beginning.

At a word level, the alignment section 122 discriminates temporal positions (time stamps and frames) of a corresponding start point and end point of each word on the time axis and attaches information thereon to the word. At a phoneme level, the alignment section 122 discriminates temporal positions of a corresponding start point and end point of each phoneme on the time axis and attaches information thereon to the phoneme. Once the voices on different channels can be aligned on the time axis, simultaneous speech segments (grayed out in FIG. 3) in the transcripts of the two voices can be identified at each of the word and phoneme levels.

Now, referring back to FIG. 2, the speech synthesizing section 124 combines sounds on each channel of the transcript-attached stereo sound 112 and thereby generates synthesized monaural sound 126. The synthesized monaural sound 126 is a virtual sound, which assumes that stereo sound is recorded as monaural sound. Once generated, the synthesized monaural sound 126 is also transformed into time series feature values of speech by the speech analyzing section 102. The speech synthesizing section 124 makes up a speech synthesizing section in the present embodiment.

The language model construction section 130 trains the language model 106 based on alignment results produced by the alignment section 122. The language model construction section 130 according to the present embodiment, identifies a portion in which plural speakers simultaneously make utterances, based on the temporal positions attached by the alignment section 122 described above, replaces corresponding transcribed portions in the transcripts of stereo sound with a unit which represents a simultaneous speech segment, and thereby generates training data and constructs a language model. Preferably, the unit which represents a simultaneous speech segment coincides with the unit of language modeling, which is done in word units in the described embodiment. Hereinafter, such a word will be referred to as an overlap word. That is, the constructed language model 106 contains overlap words as well as ordinary words. Note that in an embodiment in which language modeling is done in syllable units, overlap syllables may be used in modeling.

Now, the language model will be described by taking a word N-gram as an example. N can take 2, 3, 4, or the like according to a scale of the training data. A trigram whose N is 3 is a model in which the probability of $w_i$ being a predetermined word depends only on previous words $w_{i-2}$ and $w_{i-1}$ and the probability of generating the label column W can be expressed by the following formula.

$$p(W) = p(w_1, w_2, \ldots, w_I) \quad \text{Expression 2}$$
$$= p(w_1)p(w_2 \mid w_1)p(w_3 \mid w_2, w_1) \ldots$$
$$p(w_i \mid w_{i-1}, w_{i-2}) \ldots p(w_I \mid w_{I-1}, w_{I-2})$$

In the training data from which $p(w_x|w_y,w_z)$ is trained, a maximum likelihood estimate can be found from the number $f_x$ of times that $w_x$ has occurred and the number $f_{y,z\to x}$ of times that $w_x$ has occurred after $w_y$ and $w_z$ using the following formula.

$$p(w_x \mid w_y, w_z) = \frac{f_{y,z \to x}}{f_x} \quad \text{Expression 3}$$

In the case of a trigram, parameters to be trained in the language model are $p(w_x|w_y,w_z)$ prepared for all possible combinations of word chains $w_x$, $w_y$, $w_z$. There are combinations which do not appear in the training data, and thus typically various smoothing algorithms are used to correct the probabilities of word chains which appear in the training data extremely small numbers of times. There are no particular limits on smoothing algorithms, and various smoothing algorithms are available for use including, for example, Modified Kneser-Ney, Kneser-Ney, Good-Turing, and Witten-Bell.

Also, in the described embodiment, the words modeled in the language model 106 include the overlap word which represents a simultaneous speech segment. Since the overlap word is contained in the language model 106, it is possible to model relationships between word chains and the probabilities of occurrences of the overlap word as well as relationships among word chains containing the overlap words, the types of words which occur, and probabilities of occurrences of the words, thereby making it possible to linguistically predict occurrence of simultaneous speech.

The acoustic model construction section 150 trains the acoustic model 108 based on the synthesized monaural sound 126 generated by the speech synthesizing section 124 and alignment results produced by the alignment section 122. In the present embodiment, a phoneme (hereinafter referred to as an overlap phoneme) corresponding to the overlap word described above is newly defined. The acoustic model construction section 150 identifies a speech portion in which plural speakers simultaneously make utterances, based on the temporal positions attached by the alignment section 122 described above, and replaces the corresponding transcribed portion with the overlap word. In the described embodiment, the acoustic model construction section 150 further generates training data by associating those portions of the synthesized monaural sound which are aligned with overlap words with overlap phonemes and thereby constructs the acoustic model 108. That is, the constructed acoustic model 108 contains the overlap phonemes which represent simultaneous speech segments.

Now, the acoustic model will be described by taking a phoneme-based HMM-GMM system as an example. The HMM-GMM system acoustic model is configured as a model in which a left-to-right hidden Markov model outputs feature values in each state according to a Gaussian mixture distribution. Parameters to be trained by the HMM-GMM system include a state transition probability $a_{ij}$ of the HMM from state i to state j as well as a weight $w_k$, mean vector $\mu_k$, and variance covariance matrix $\sigma_k$ of each GMM normal distribution k in each state. The variance covariance matrix of the GMM normal distribution k is often assumed to be a diagonal matrix from the viewpoint of computational complexity, and $\sigma_k$ is a vector in that case.

Also, in the HMM-GMM system, a model for generating the time series feature values X of speech is generated using a left-to-right HMM in plural states, typically three states, for one phoneme and preparing as many multistate HMMs as there are phonemes. In the case of a tristate HMM, if the number of phonemes is N, there are 3×N HMM states, each of which has one GMM as a probability distribution of outputting a feature value of the speech in the given state.

That is, the parameters to be trained by the HMM-GMM used in speech recognition are 3×N GMM parameters $\{\mu_k, \sigma_k, w_k\}$ and the state transition probabilities $\{a_{ij}\}$ of the HMMs, where 3 is the number of states. It is known that these parameters can be found from transcript-attached sound by maximum likelihood estimation using the Baum-Welch algorithm, which is a type of EM algorithm. In addition to the maximum likelihood (ML) criteria, available criteria for discriminative training of an acoustic model include maximum mutual information (MMI) criteria, minimum phone error (MPE) criteria, boosted MMI (BMMI) criteria, and the like.

Note that in the described embodiment, phonemes modeled in the acoustic model 108 include the overlap phoneme corresponding to the overlap word which represents a simultaneous speech segment. Since the acoustic model 108 contains the overlap phoneme, the probability of outputting a time series feature value is modeled when the overlap word is given. Note that the dictionary 110 contains an entry stating that the overlap phoneme corresponds to pronunciation of the overlap word. In the preferred embodiment, one overlap phoneme can be associated with the overlap word, but this does not preclude associating plural overlap phonemes with the overlap word in another embodiment.

Note that when a phoneme-based HMM-GMM system is adopted, an observed feature value $x_t$ is affected by the preceding and following phonemes, and thus in the preferred embodiment, a triphone- or pentaphone-based HMM-GMM which takes context of the preceding and following phonemes into consideration may be used. Note that in so doing, the overlap phoneme can be treated as a monophone. Also, in that case, the number of triphones or pentaphones grows as large as the third power or fifth power of the number of phonemes, making it difficult to secure sufficient training data for all the triphones or pentaphones. Thus, triphones or pentaphones similar in acoustic characteristics can be grouped on a state by state basis and training can be conducted by sharing parameters. In determining triphones or pentaphones whose parameters are to be shared, a decision tree algorithm can be used.

Note that in the foregoing and following descriptions, matters relevant to the scope of the present invention are discussed mainly, and description of relatively irrelevant matters are omitted. However, needless to say, processes which can be performed to improve speech recognition accuracy, including processes such as detection of speech intervals in speech data, speaker adaptation of an acoustic model, speaker adaptation of features, noise adaptation of an acoustic model, feature enhancement, feature normalization, discriminative training of an acoustic model, and discriminative feature training can be used in combination with the acoustic model and language model construction processes according to the present invention.

A language model construction process according to the present embodiment will be described in more detail below with reference to FIGS. 4 to 6, and 10.

Figure 4:
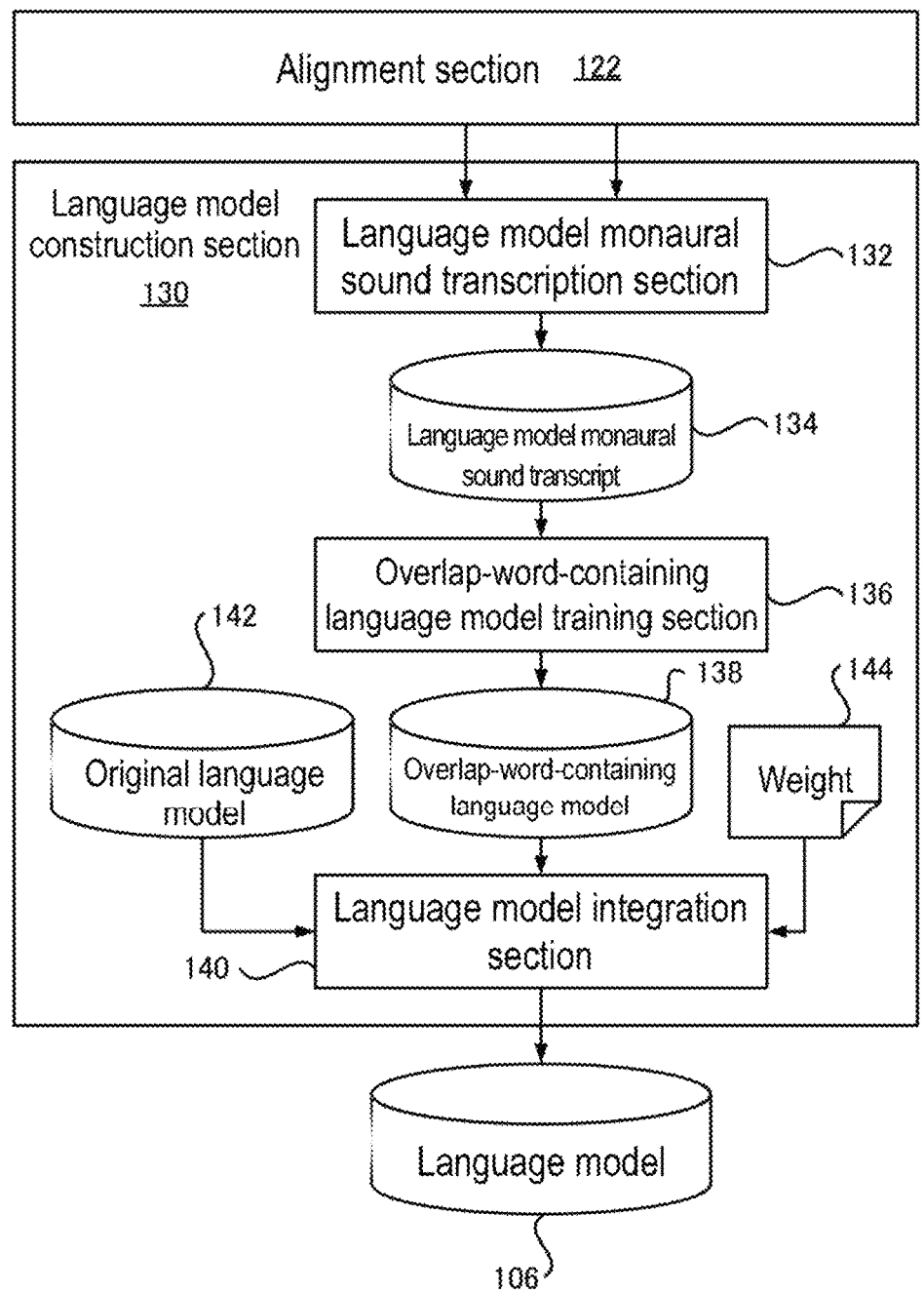
FIG. 4 is a detailed block diagram showing a language model construction section of the speech recognition system according to the embodiment of the present invention.

FIG. 4 is a detailed block diagram showing the language model construction section 130 of the speech recognition model construction section 120 in the speech recognition system 100 according to the embodiment of the present invention. As shown in FIG. 4, the language model construction section 130 includes a language model monaural sound transcription section 132, an overlap-word-containing language model training section 136, and a language model integration section 140.

The language model monaural sound transcription section 132 joins the transcripts of the respective channels of stereo sound along the time axis based on alignment results, and thereby creates a transcript of synthesized monaural sound. In so doing, the transcription section 132 replaces predetermined transcribed portions overlapping between plural channels on the time axis with the overlap word which represents a simultaneous speech segment. The transcript created here is referred to as a language model monaural sound transcript 134.

With the language model, it is desirable to model every word chain which can generate overlap words, even if words only partially overlap on the time axis or even if one of the voices is dominant and is phonetically recognizable, preferably all portions are replaced with the overlap words. Note that when an overlap occurs, stretching over plural words, the overlapping portion can be replaced with as many overlap words as the number of words involved in the overlap on one of the stereo channels whichever contains the larger number of words involved in the overlap.

The overlap-word-containing language model training section 136 trains the language model containing the overlap words based on the created language model monaural sound transcript 134. When the language model is an N-gram, using the created language model monaural sound transcript 134 prepared for each conversation, as training data here, the language model is found by maximum likelihood estimation by counting the number of occurrences of all the words including the overlap words as well as the number of occurrences of all the word chains. The trained language model is referred to as an overlap-word-containing language model 138.

The language model integration section 140 integrates the trained overlap-word-containing language model 138 and an original language model 142 and thereby forms a final language model 106 making up a speech recognition model. The original language model 142 is a language model trained from training data and the like containing no overlap word and used before for normal speech recognition. The original language model 142 may be a language model trained from transcript-attached sound on each channel of the transcript-attached stereo sound 112 or a language model trained from entirely different training data.

As an adjustment parameter, the language model construction section 130 holds a weight 144 used in integrating the overlap-word-containing language model 138 and original language model 142. The language model integration section 140 integrates language models based on the weight 144. The reason why the overlap-word-containing language model 138 is integrated with the original language model 142 by being assigned a weight in this way is to adjust the action of the overlap-word-containing language model 138 moderately.

Note that N-gram language models are integrated as follows. The original language model 142, which does not contain any overlap word, is considered to maintain a state of zero probability of a word chain containing an overlap word. In contrast, in the overlap-word-containing language model 138, probabilities are given to both word chains containing no overlap word and word chains containing the overlap word. Therefore, the word chains containing an overlap word is given a value multiplied by a ratio (e.g., 2/10 when an integration ratio between the original and overlap-word-containing language model is 8:2) corresponding to the weight 144. The other word chains contained in the original language model 142 are given a weighted average value corresponding to the weight 144.

Figure 5:
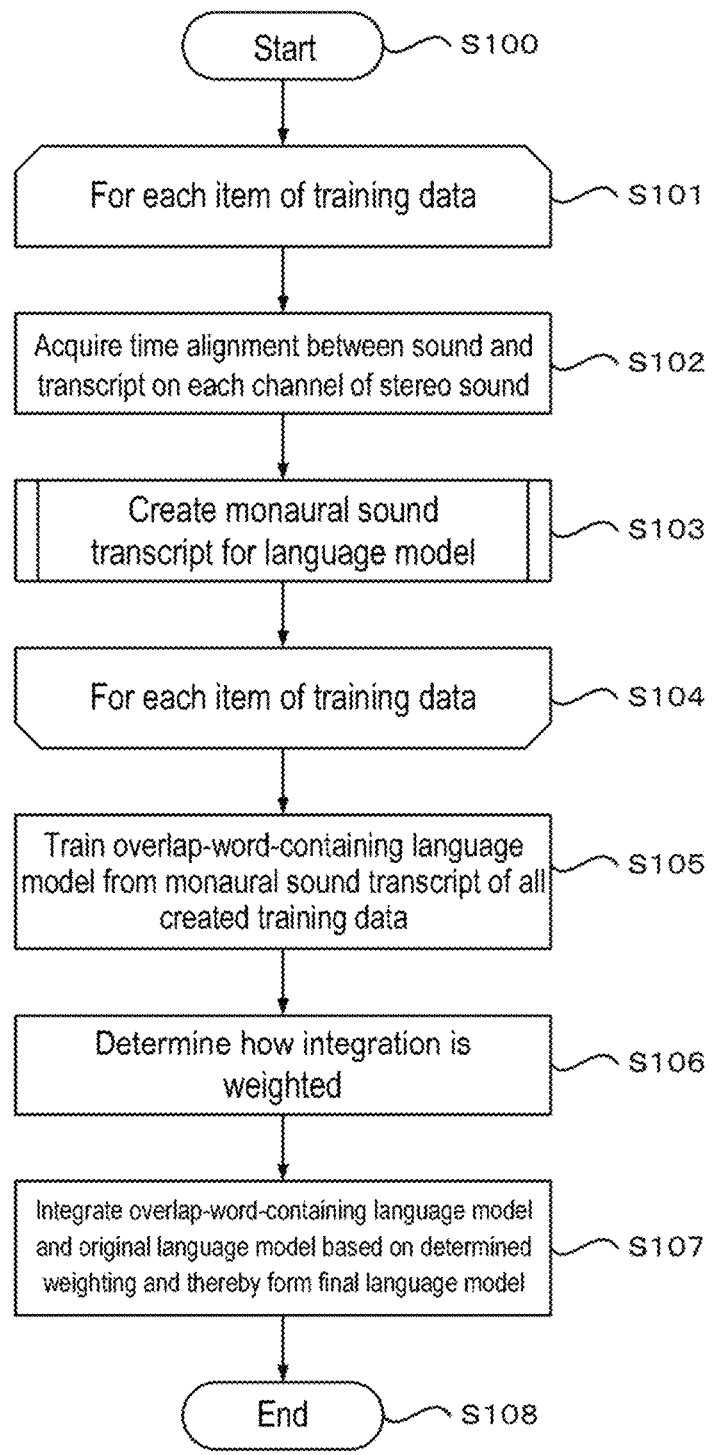
FIG. 5 is a flowchart showing an exemplary language model construction process of the speech recognition system according to the embodiment of the present invention.

FIG. 5 is a flowchart showing the language model construction process of the speech recognition system 100 according to the embodiment of the present invention. The process shown in FIG. 5 is started in step S100, for example, by a computer of the speech recognition system 100 in response to a user command to construct a speech recognition model. In the loop of steps S101 to S104, the computer of the speech recognition system 100 performs the processes of steps S102 and S103 with respect to each item of the training data of the provided transcript-attached stereo sound 112.

In step S102, using the alignment section 122, the computer acquires time alignment between the sound and transcript on each channel of the stereo sound. Note that to detect simultaneous speech segments on a word by word basis, it is sufficient here if alignment is achieved at least at the word level. In step S103, the computer invokes the language model monaural sound transcription section 132 and performs the process of creating a monaural sound transcript for the language model.

Figure 6:
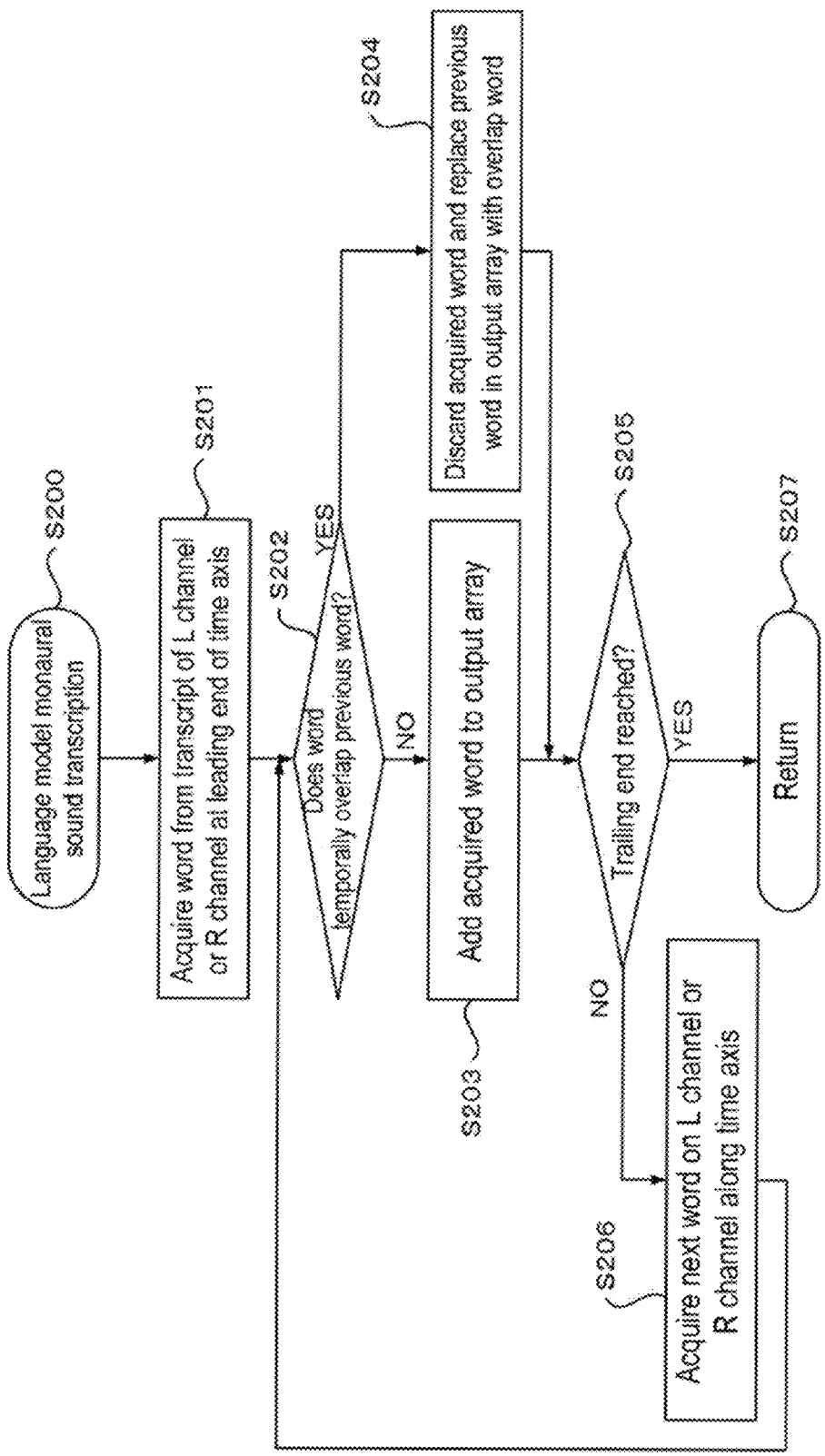
FIG. 6 is a flowchart showing a language model monaural sound transcription process invoked in step S103 shown in FIG. 5.

FIG. 6 is a flowchart showing a language model monaural sound transcription process invoked in step S103 shown in FIG. 5. The process shown in FIG. 6 is invoked in step S103 shown in FIG. 5 and started in step S200.

In step S201, the computer acquires a word from the transcript of the L channel or R channel at the leading end of the time axis. In step S202, the computer determines whether the acquired word temporally overlaps the previous word. If it is determined in step S202 that the acquired word does not temporally overlap the previous word (NO), the processing branches off to step S203. In the first loop, since there is no previous word, it is simply determined that there is no overlap. Also, in the second and subsequent loops, if the temporal position of the start point of the acquired word is behind the temporal position of the end point of the previous word, it is simply determined that temporally there is no overlap. In step S203, the computer adds the acquired word to an output array, and then advances the processing to step S205.

In contrast, if it is determined in step S202 that the acquired word overlaps the previous word (YES), the processing branches off to step S204. In the second and subsequent loops, if the temporal position of the start point of a word on one of the acquired channels is located between the temporal positions of start point and end point of the previous word on the other channel, it is determined that the words temporally overlap each other. In step S204, the computer discards the acquired word and replaces the previous word in the output array with the overlap word, and then advances the processing to step S205.

In step S205, the computer determines whether or not the trailing end of the training data has been reached. If it is determined in step S205 that the trailing end has not been reached (NO), the processing advances to step S206. In step S206, the computer acquires the next word on the L channel or R channel along the time axis, and then the processing loops back to step S202. On the other hand, if it is determined in step S205 that the trailing end has been reached (YES), the processing branches off to step S207, and control is returned to the original process shown in FIG. 5.

Figure 10:
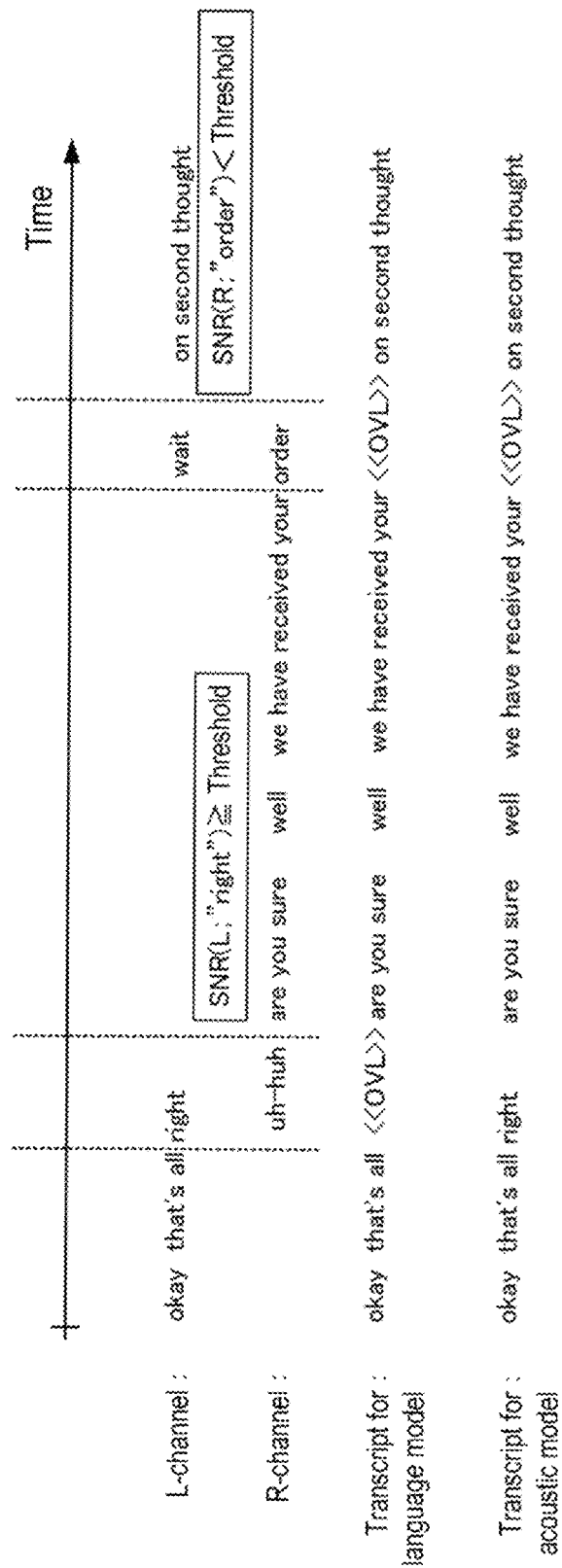
FIG. 10 is diagram showing the process of creating monaural sound transcripts (in English) for a language model and acoustic model from stereo transcripts.

FIG. 10 is a diagram describing the process of creating transcripts for language models from stereo transcripts.

Also, in the example shown in FIG. 10, words are acquired in the order: "okay," "that's," "all," "right," "uh-huh," "are," "you," "sure," . . . . When that the word "uh-huh" on the R channel is acquired, it is judged that the word overlaps the previous word "right" on the L channel. In this case, the word "uh-huh" is discarded, and the previous word "right" in the output array is replaced with the overlap word "<<OVL>>". Regarding the word sequence "your," "order," "wait," and "on," a similar replacement is carried out.

Note that when an overlap occurs stretching over plural words, the overlapping portion can be replaced with as many overlap words as the number of words involved in the overlap on one of the stereo channels whichever contains the larger number of words involved in the overlap.

Referring back to FIG. 5, when the loop S101 to S104 is finished for all the training data, the processing advances to step S105. In step S105, using the overlap-word-containing language model training section 136, the computer trains the overlap-word-containing language model 138 from the language model monaural sound transcript of all the prepared training data. In step S106, the computer reads the set point of the weight 144, and determines how integration is weighted. In step S107, using the language model integration section 140, the computer integrates the overlap-word-containing language model 138 and original language model 142 based on the determined weighting and thereby forms a final language model 106, and then finishes the present process in step S108.

Note that in FIG. 5, all the steps have been described as being carried out by a single computer of the speech recognition system 100. However, this does not preclude parallel distributed processing of different steps or substeps of each step by plural computers of the speech recognition system 100.

An acoustic model construction process according to the present embodiment will be described in more detail below with reference to FIGS. 7 to 13.

Figure 7:
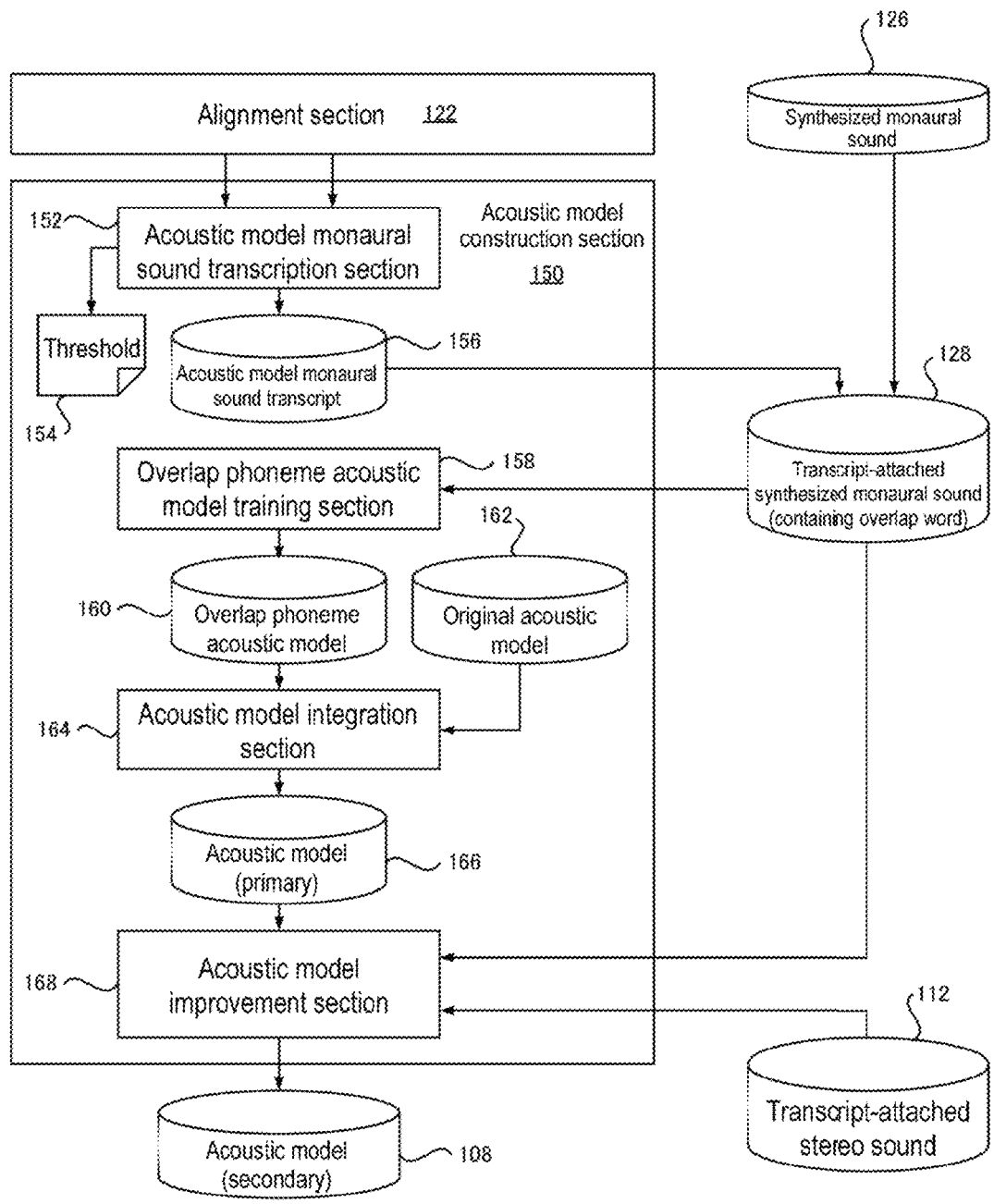
FIG. 7 is a detailed block diagram showing an acoustic model construction section in the speech recognition system according to the embodiment of the present invention.

FIG. 7 is a detailed block diagram of an acoustic model construction section 150 of the speech recognition model construction section 120 in the speech recognition system 100 according to the embodiment of the present invention. As shown in FIG. 7, the acoustic model construction section 150 includes an acoustic model monaural sound transcription section 152, an overlap phoneme acoustic model training section 158, an acoustic model integration section 164, and an acoustic model improvement section 168.

The acoustic model monaural sound transcription section 152 joins the transcripts of the respective channels of stereo sound along the time axis based on alignment results, and thereby creates a transcript of synthesized monaural sound 126. In so doing, the acoustic model monaural sound transcription section 152 replaces predetermined transcribed portions overlapping between plural channels along the time axis with a unit (which is a word, specifically, an overlap word, in the described embodiment) which represents a simultaneous speech segment. The created transcript is referred to as an acoustic model monaural sound transcript 156.

With the acoustic model, it is preferable to extract phonemes from wherever possible, and thus transcribed portions overlapping each other along the time axis are not always replaced with the overlap word without exception. Portions where one of the voices is dominant, the transcripts are joined along the time axis using the dominant transcribed portion. Only simultaneous speech in which neither utterance is dominant and thus simultaneous speech in which utterances are of similar loudness and difficult to recognize are replaced with the overlap word.

Therefore, the acoustic model construction section 150 according to the present embodiment holds a threshold 154 of SNR (Signal to Noise Ratio) to determine whether either utterance is dominant, as an adjustment parameter. Then, the acoustic model monaural sound transcription section 152 creates transcript based on the threshold 154. In so doing, the acoustic model monaural sound transcription section 152 compares the SNR with the threshold 154, assuming that the larger of the voices is a signal while the smaller of the voices being noise. If the SNR is equal to or larger than the threshold (e.g., 10 dB) it is determined that the larger voice is dominant.

The created acoustic model monaural sound transcript 156 is paired with the synthesized monaural sound 126 and configured into a transcript-attached synthesized monaural sound 128 containing the overlap words.

Based on the created transcript-attached synthesized monaural sound 128, the overlap phoneme acoustic model training section 158 trains an acoustic model of the overlap phoneme which represents a simultaneous speech segment from portions (time series feature values of the speech) aligned with the overlap words in the synthesized monaural sound. In an HMM-GMM system, all portions aligned with the overlap words are extracted from the synthesized monaural sound serving as training data prepared for each conversation and are associated with the overlap phonemes, and then using the resulting data as training data, as many GMM parameters $\{\mu_k, \sigma_k, w_k\}$ as there are states corresponding to the overlap phoneme as well as the state transition probabilities $\{a_{ij}\}$ of the HMMs are trained. The trained acoustic model is referred to as an overlap phoneme acoustic model 160.

The acoustic model integration section 164 unites the trained overlap phoneme acoustic model 160 and an original acoustic model 162 and thereby forms an acoustic model (primary) 166. The original acoustic model 162 is an acoustic model trained from training data and the like which do not contain any overlap and used in normal speech recognition, but may be an acoustic model trained from the transcript-attached stereo sound 112 or an acoustic model trained from entirely different training data.

Note that in the HMM-GMM system, the integration of acoustic models is completed by combining HMM-GMMs corresponding to regular phonemes and an HMM-GMM corresponding to the overlap phoneme.

The acoustic model improvement section 168 performs multi-condition training using the formed acoustic model (primary) 166 as an initial value and using training data including the original transcript-attached stereo sound 112 and the transcript-attached synthesized monaural sound 128 generated by the above process. This provides a final acoustic model (secondary) 106, making up a speech recognition model, as an improvement over the acoustic model (primary) 166.

Note that, although the acoustic model (primary) may be used as a final acoustic model, according to the preferred embodiment, an acoustic model (secondary) which has gone through multi-condition training can be used as a final acoustic model. By including the transcript-attached synthesized monaural sound 128 in training data, the feature value is associated with a correct label even in the case of an overlap in which one of voices is dominant. This makes it possible to more accurately recognize a speech portion, i.e., a simultaneous speech segment, in which one of utterances is dominant, than an acoustic model, in which feature values are associated with correct labels only in a completely overlap-free state (with such an acoustic model, chances are relatively high that a phoneme is recognized incorrectly even in a speech portion, i.e., a simultaneous speech segment, in which one of utterances is dominant and which any man can catch).

Figure 8:
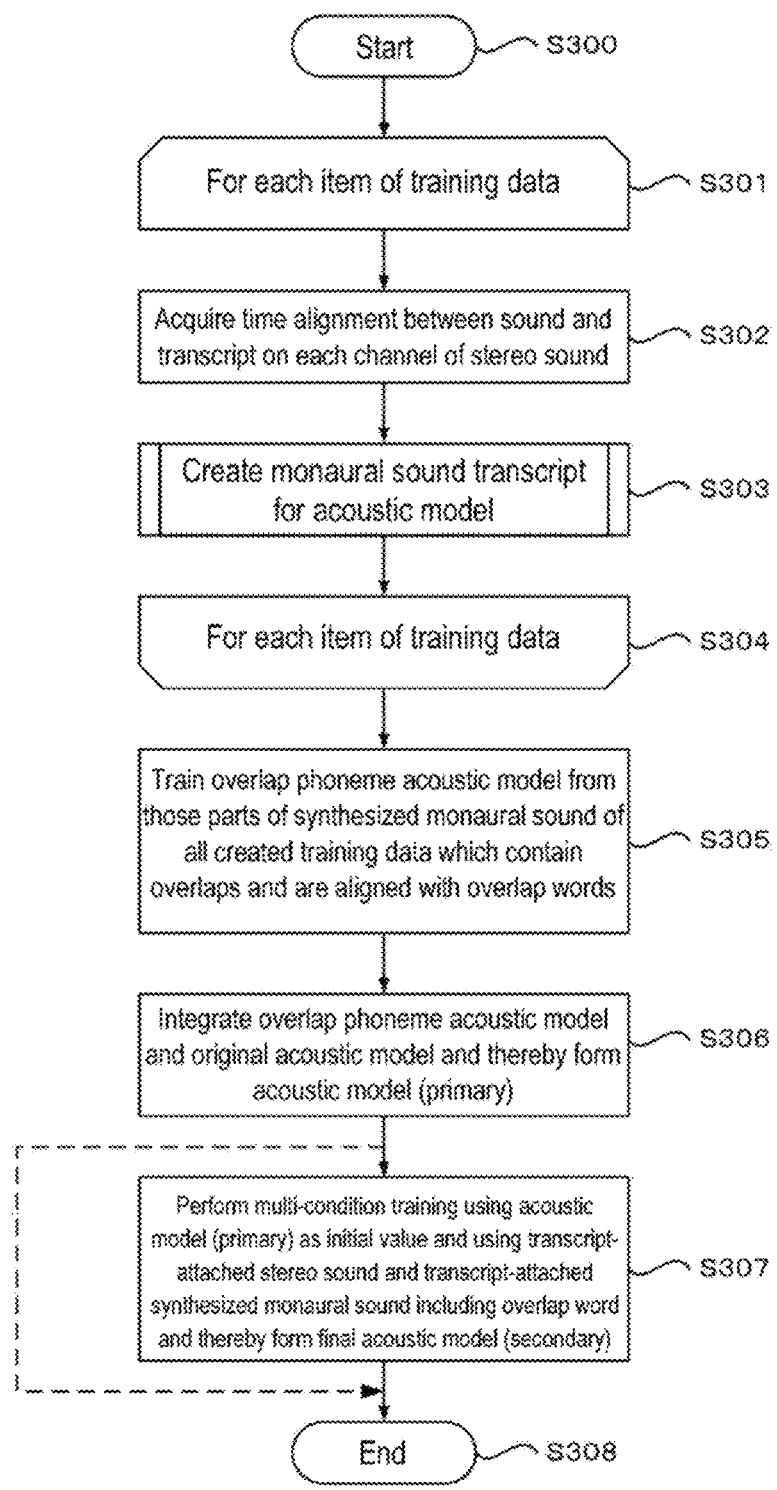
FIG. 8 is a flowchart showing an acoustic model construction process in the speech recognition system according to the embodiment of the present invention.

FIG. 8 is a flowchart showing an acoustic model construction process in the speech recognition system 100 according to the embodiment of the present invention. The process shown in FIG. 8 is started in step S300, for example, by the computer of the speech recognition system 100 in response to a user command to construct a speech recognition model. In the loop of steps S301 to S304, the computer of the speech recognition system 100 performs the processes of steps S302 and S303 for each item of the training data of the provided transcript-attached stereo sound 112.

In step S302, using the alignment section 122, the computer acquires time alignment between the sound and transcript on each channel of the stereo sound. Note that, to detect simultaneous speech segments on a word by word basis, it is sufficient here if alignment is achieved at least at the word level, and that, if step S102 shown in FIG. 5 has already been carried out, there is no need to carry out the step again. In step S303, the computer invokes the acoustic model monaural sound transcription section 152 and performs the process of creating a monaural sound transcript for an acoustic model.

Figure 9:
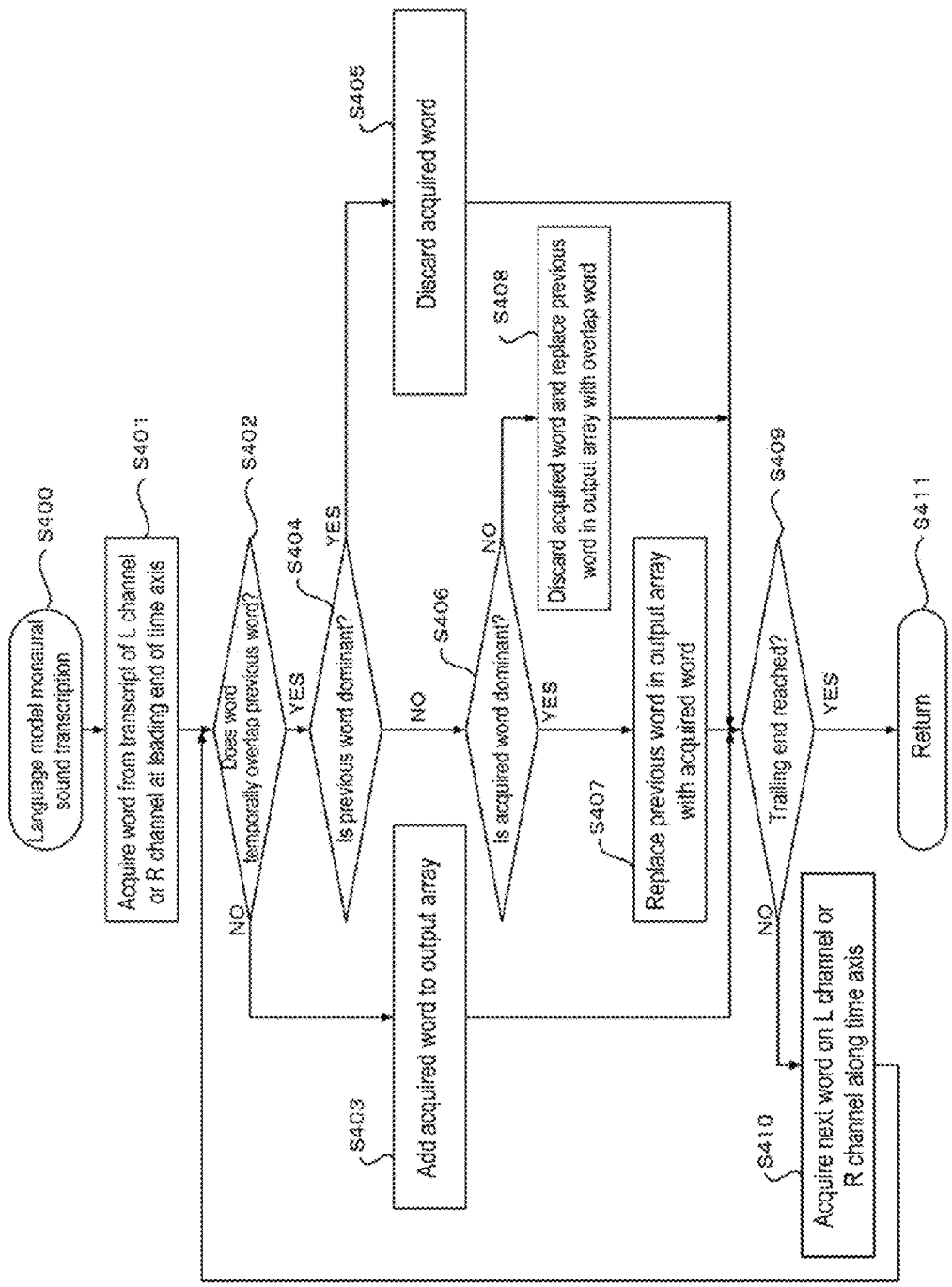
FIG. 9 is a flowchart showing a monaural sound transcription process for an acoustic model, the process being invoked in step S303 shown in FIG. 8.

FIG. 9 is a flowchart showing an acoustic model monaural sound transcription process invoked in step S303 shown in FIG. 8. The process shown in FIG. 9 is invoked in step S303 shown in FIG. 8 and started in step S400.

In step S401, the computer acquires a word from the transcript of the L channel or R channel at the leading end of the time axis. In step S402, the computer determines whether the acquired word temporally overlaps the previous word. If it is determined in step S402 that the acquired word does not temporally overlap the previous word (NO), the processing branches off to step S403. In step S403, the computer adds the acquired word to an output array, and then advances the processing to step S409.

In contrast, if it is determined in step S402 that the acquired word overlaps the previous word (YES), the processing branches off to step S404. In step S404, the computer determines whether or not the previous word is dominant over the acquired word. If it is determined in step S404 that the previous word is dominant (YES), the processing branches off to step S405. In step S405, the computer discards the acquired word and then advances the processing to step S409.

In contrast, if it is determined in step S404 that the previous word is not dominant (NO), the processing branches off to step S406. In step S406, the computer further determines whether or not the acquired word is dominant over the previous word. If it is determined in step S406 that the acquired word is dominant (YES), the processing branches off to step S407. In step S407, the computer replaces the previous word in the output array with the acquired word, and then advances the processing to step S409.

In contrast, if it is determined in step S406 that the acquired word is not dominant (NO), the processing branches off to step S408. This corresponds to a case in which neither the acquired word nor the previous word is dominant. In step S408, the computer discards the acquired word and replaces the previous word in the output array with the overlap word, and then advances the processing to step S409.

In step S409, the computer determines whether or not the trailing end of the training data has been reached. If it is determined in step S409 that the trailing end has not been reached (NO), the processing advances to step S410. In step S410, the computer acquires the next word on the L channel or R channel along the time axis, and then the processing loops back to step S402. If it is determined in step S409 that the trailing end has been reached (YES), the processing branches off to step S411, and then returns to the original process shown in FIG. 8.

FIG. 10 also shows the process of creating a transcript for an acoustic model from stereo transcripts.

Also, in the first half of the example shown in FIG. 10, words "okay," "that's," "all," "right," "uh-huh," "are," . . . are acquired in this order. When the word "uh-huh" on the R channel is acquired, it is judged that the word overlaps the previous word "right" on the L channel. However, since the sound of "right" on the L channel is louder and has an SNR equal to or larger than the threshold, it is determined that the word on the L channel is dominant, the word "uh-huh" on the R channel is discarded, and the output array is maintained as it is. That is, instead of replacement with the overlap word, the dominant transcribed portion is adopted. In contrast, "your," "order," "wait," and "on" are acquired in this order in the second half. When "wait" on the L channel is acquired, it is judged that the word overlaps the previous word "order" on the R channel. In this case, the sound of the word "order" on the R channel is a little louder, but since the SNR is smaller than the threshold, it is determined that neither word is dominant, and "wait" on the L channel is discarded and the previous word "order" in the output array is replaced with the overlap word "<<OVL>>".

As shown in FIG. 10, the created monaural sound transcript could result in being different between when it is intended for an acoustic model and when it is intended for a language model.

Referring back to FIG. 8, when the loop S301 to S304 is finished for all the training data, the processing advances to step S305. In step S305, using the overlap phoneme acoustic model training section 158, the computer trains the overlap phoneme acoustic model 160 from those parts of the synthesized monaural sound of all the created training data which contain simultaneous speech segments and are aligned with overlap words.

Figure 11:
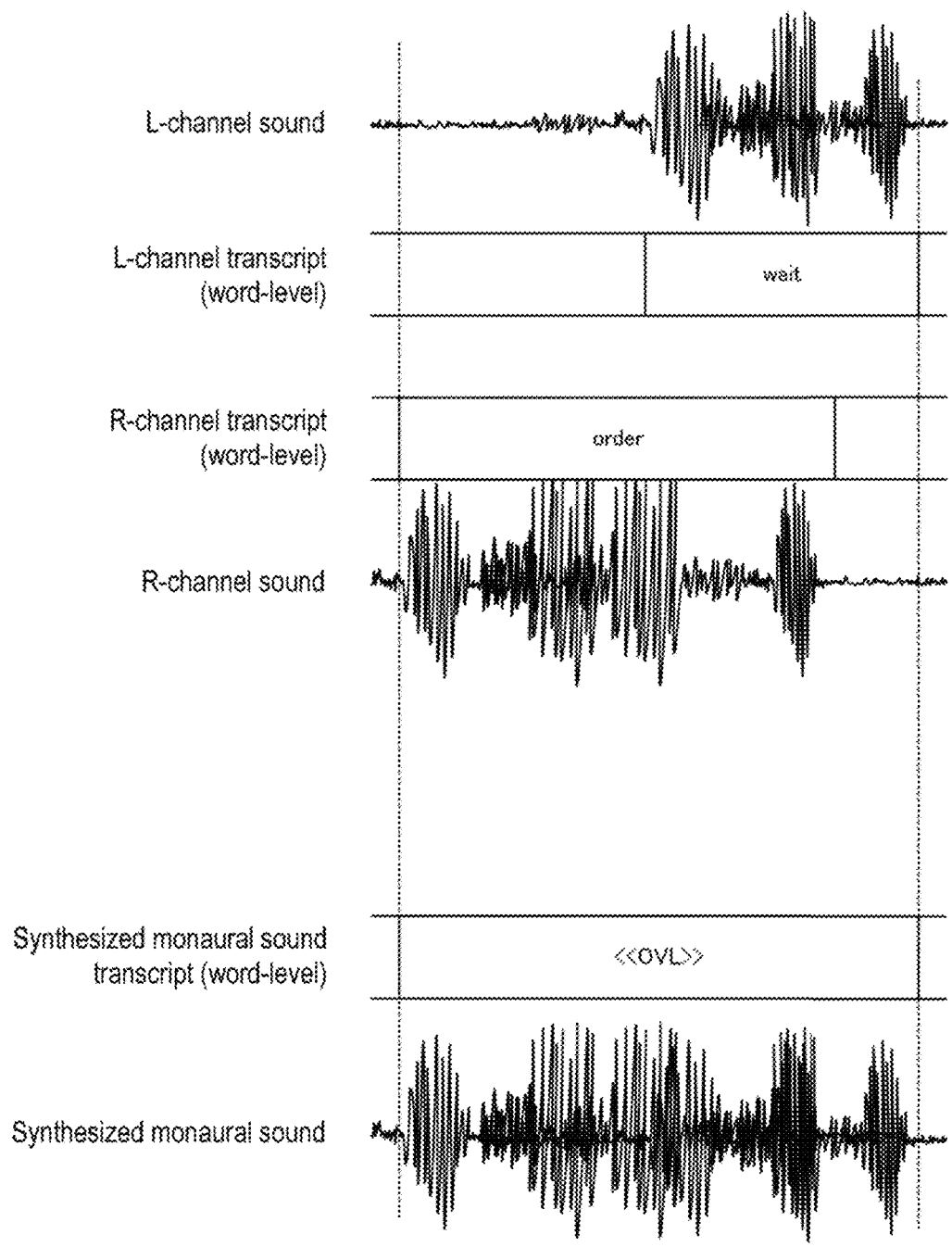
FIG. 11 is a diagram showing a speech portion aligned with the overlap word in a transcript (in English) when simultaneous speech segments are detected on a word by word basis.

FIG. 11 is a diagram showing a speech portion aligned with the overlap word in a transcript of synthesized monaural sound. Note that speech portions have been transformed into time series feature values by the speech analyzing section 102, but are associated with portions of a speech waveform here for convenience of explanation.

In the example of FIG. 11, the word "order" on the R channel and the word "wait" on the L channel are replaced, in the monaural sound transcript, with the overlap word "<<OVL>>" which represents a simultaneous speech segment.

The speech portions (time series feature values of the speech) aligned with the overlap words "<<OVL>>" along the time axis make up training data by being associated with the overlap phonemes corresponding to the overlap word, and the overlap phoneme acoustic model 160 is trained based on the training data.

Although, in the described embodiment, it has been stated that simultaneous speech segments are detected on a word by word basis and that the unit which represents a simultaneous speech segment is a word-based unit and that the simultaneous speech segment is replaced with the overlap word, the present invention is not limited to this embodiment. In another embodiment, simultaneous speech segments may be detected on a phoneme by phoneme basis and the phoneme serving as the unit which represents a simultaneous speech segment may be used for replacement.

Figure 12:
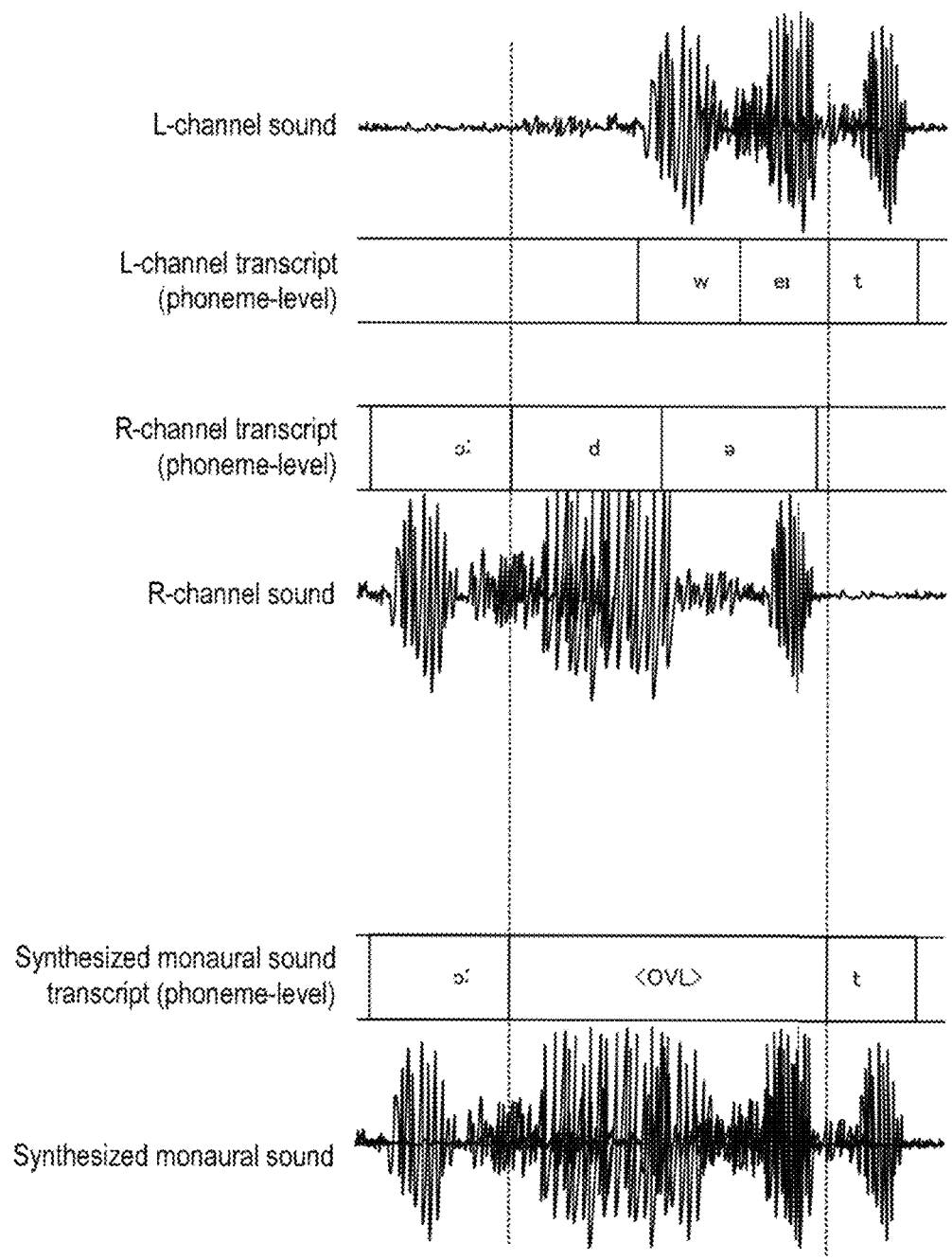
FIG. 12 is diagram showing a speech portion aligned with an overlap unit in a transcript (in English) when simultaneous speech segments are detected on a phoneme by phoneme basis.

FIG. 12 is a diagram showing a speech portion aligned with an overlap unit in a transcript when simultaneous speech segments are detected on a phoneme by phoneme basis. Note that speech portions have been transformed into time series feature values by the speech analyzing section 102, but are associated with portions of a speech waveform here for convenience of explanation.

Although the monaural sound transcription process for an acoustic model shown in FIG. 9 is performed on a word by word basis, when simultaneous speech segments are designed to be detected on a phoneme by phoneme basis, the process can be handled on a phoneme by phoneme basis rather than on a word by word basis. In that case, alignment can be achieved at the phoneme level in step S302 shown in FIG. 8.

In the example of FIG. 12, part of the phoneme string of the word "order" on the R channel and part of the phoneme string of the word "wait" on the L channel are replaced, in the monaural sound transcript, with the overlap unit "<<OVL>>" which represents a simultaneous speech segment.

The speech portions (time series feature values of the speech) aligned with the overlap unit "<<OVL>>" along the time axis make up training data by being associated with the overlap phonemes corresponding to the overlap unit, and the overlap phoneme acoustic model 160 is trained based on the training data. In this way, the unit used to detect overlaps may be changed from a word-based unit to a phoneme-based unit.

Referring back to FIG. 8, in step S306, using the acoustic model integration section 164, the computer integrates the overlap phoneme acoustic model 160 and the original acoustic model 162 and thereby forms the acoustic model (primary) 166. In step S307, the acoustic model improvement section 168 performs multi-condition training using the acoustic model (primary) 166 as an initial value and using the transcript-attached stereo sound 112 and the transcript-attached synthesized monaural sound 128 including the overlap word and thereby forms the final acoustic model (secondary) 108. Then, the present process is finished in step S308. Note that in another embodiment which uses the acoustic model (primary) 166, as it is, as the final acoustic model, the present process is finished by advancing from step S306 directly to step S308.

Note that in FIG. 8, all the steps have been described as being carried out by a single computer of the speech recognition system 100. However, this does not preclude parallel distributed processing of different steps, and moreover, substeps of each step, by plural computers of the speech recognition system 100.

Also, the acoustic model construction process shown in FIGS. 7 and 8 obtains the final acoustic model (secondary) 108 by constructing the overlap phoneme acoustic model 160 once, integrating the overlap phoneme acoustic model 160 with the original acoustic model 162, and further conducting multi-condition training using the resulting acoustic model (primary) 166 as an initial value. However, the method for obtaining a final acoustic model is not limited to this.

Figure 13:
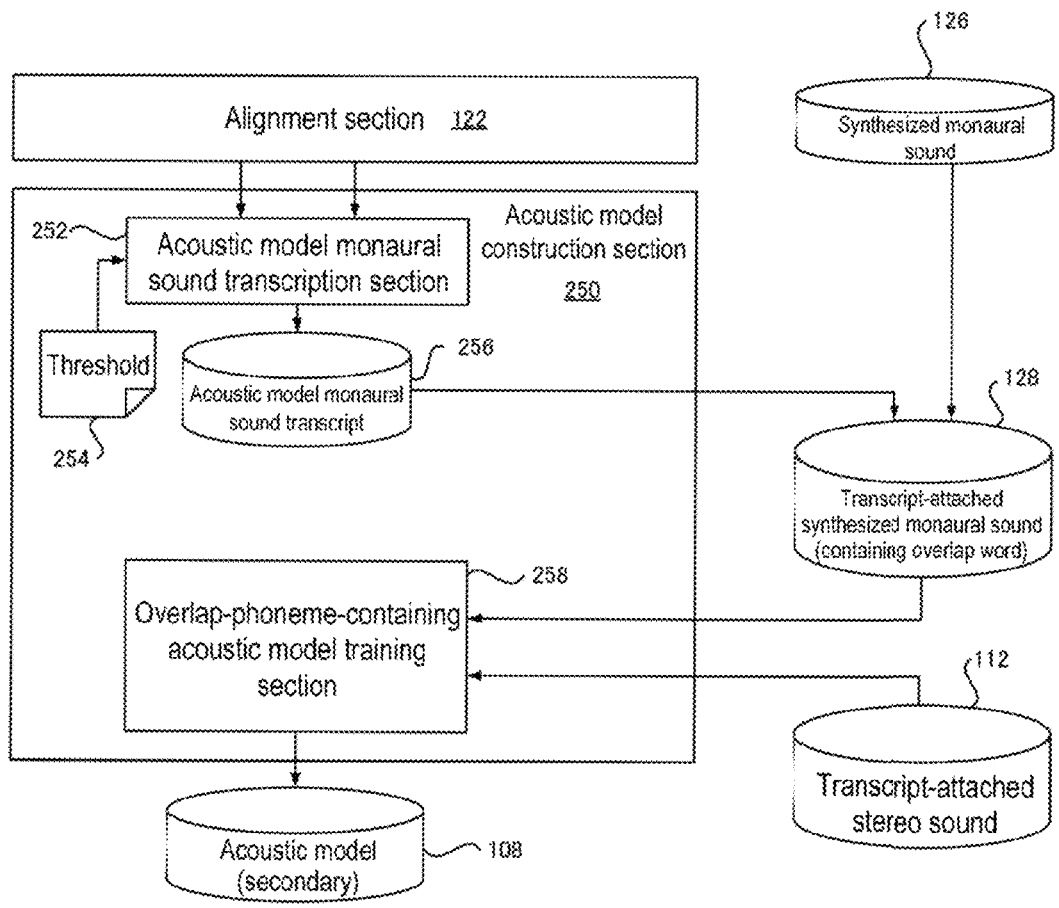
FIG. 13 is a detailed block diagram showing an acoustic model construction section in a speech recognition system according to another embodiment of the present invention.

FIG. 13 is a detailed block diagram showing an acoustic model construction section 250 in a speech recognition system 100 according to another embodiment of the present invention. As shown in FIG. 13, the acoustic model construction section 250 according to the other embodiment includes an acoustic model monaural sound transcription section 252 and an overlap-phoneme-containing acoustic model training section 258.

As with the embodiment shown in FIG. 7, the acoustic model construction section 250 according to the present embodiment holds a threshold 254 of SNR (Signal to Noise Ratio) to determine whether either utterance is dominant, as an adjustment parameter, and the acoustic model monaural sound transcription section 252 joins the transcripts of the respective channels of stereo sound along the time axis based on alignment results, and thereby creates an acoustic model monaural sound transcript 256 for the synthesized monaural sound 126. The created acoustic model monaural sound transcript 256 is paired with the synthesized monaural sound 126 and configured into a transcript-attached synthesized monaural sound 128 containing the overlap words.

The overlap-phoneme-containing acoustic model training section 258 performs multi-condition training using training data including the original transcript-attached stereo sound 112 and the transcript-attached synthesized monaural sound 128 generated by the above process and thereby constructs a final acoustic model (secondary and the like) 106 directly from scratch, making up a speech recognition model. The acoustic model (secondary and the like) 106 includes an acoustic model of the overlap phoneme corresponding to the overlap word in the transcript-attached synthesized monaural sound 128. As many GMM parameters $\{\mu_k, \sigma_k, w_k\}$ as there are states corresponding to plural phonemes, including regular phonemes and the overlap phoneme, as well as the state transition probabilities $\{a_{ij}\}$ of the HMMs are trained as a result of the multi-condition training.

Again, since the transcript-attached synthesized monaural sound 128 is included in the training data, correct labels are associated with feature values in the case of an utterance overlap in which one of voices is dominant. This makes it possible to more accurately recognize a simultaneous speech segment in which one of utterances is dominant.

A speech recognition process using the language model 106 and acoustic model 108 configured as described above will be described below.

Referring back to FIG. 1, the speech recognizing section 104 integrates the language model 106 and acoustic model 108 and searches for the most likely word sequence. As described above the speech recognizing section 104 determines the word sequence W^ which maximizes an objective function, based on the time series feature values X of inputted speech.

The objective function, log p(X|W)+log p(W) described above (Formula 1) may be used without any changes, but suitably, log p(X|W)+α log p(W)+βI may be used by introducing the number I of words included in the word sequence W, a parameter α used to make an adjustment as to which should be emphasized, the acoustic model or language model, and a parameter β used to adjust an insertion penalty configured to prevent the number of words from excessively increasing. In determining the word sequence, typically searching and pruning are carried out appropriately using a predetermined decoding algorithm so as to obtain appropriate recognition results within a realistic computation time.

In the speech recognition using the language model 106 and acoustic model 108 constructed by the construction process described above, since the overlap words are contained in the language model, simultaneous speech can be predicted linguistically. Also, the acoustic model 108 contains overlap phonemes corresponding to the overlap words. More suitably, only simultaneous speech in which utterances are of similar loudness and difficult to recognize is contained in training data used to train the acoustic model of the overlap phoneme while speech which contains the voice of a conversation partner as small noise and which is likely to be able to be recognized is contained in training data used to train acoustic models of regular phonemes. This makes it possible to discriminate only those portions of simultaneous speech which hardly lend themselves to speech recognition and enables suitable speech recognition of those portions of simultaneous speech which are likely to be recognized. Consequently, even in the case of multi-speaker monaural sound in which simultaneous speech can occur, speech recognition can be performed while discriminating simultaneous speech segments. In particular, since simultaneous speech segments are predicted linguistically, the occurrence of burst errors is reduced, thus improving the accuracy of speech recognition.

In this way, with the language model 106 and acoustic model 108 according to the embodiment of the present invention, any simultaneous speech segment contained as a burst error in a substitution error and insertion error is absorbed in a garbage model, consequently making it possible to reduce substitution errors and insertion errors and resulting in a significant improvement of recognition accuracy as a whole.

Note that the portion discriminated as a simultaneous speech segment may be deleted as unnecessary from the speech recognition results to be outputted. In that case, the above-mentioned language model 106 containing the overlap word and acoustic model 108 containing the overlap phoneme corresponding to the overlap word can be said to be speech recognition models containing a garbage model used to discard the simultaneous speech segment as garbage. Alternatively, the portion discriminated as a simultaneous speech segment may be included in speech recognition results by attaching attribute information, indicating that the portion is a simultaneous speech segment. When the attribute information is attached in this way, speech recognition of the portion to which the attribute information is attached can be attempted wherever possible, for example, by using more advanced speech recognition process, the use of which for all portions is not justified from the viewpoint of computational complexity.

Also, in the described embodiment, the language model 106 and acoustic model 108 which make up the speech recognition model are created by the language model construction method and acoustic model construction method according to the embodiment of the present invention. However, this does not preclude creating one of the language model 106 and acoustic model 108 by another method. In another embodiment, a language model containing a language unit (overlap word) which represents a simultaneous speech segment may be formed assuming that simultaneous speech occurs according to a predetermined rule (with a certain probability), and a speech recognition model may be constructed by combining the language model with the acoustic model 108 described above.

Figure 14:
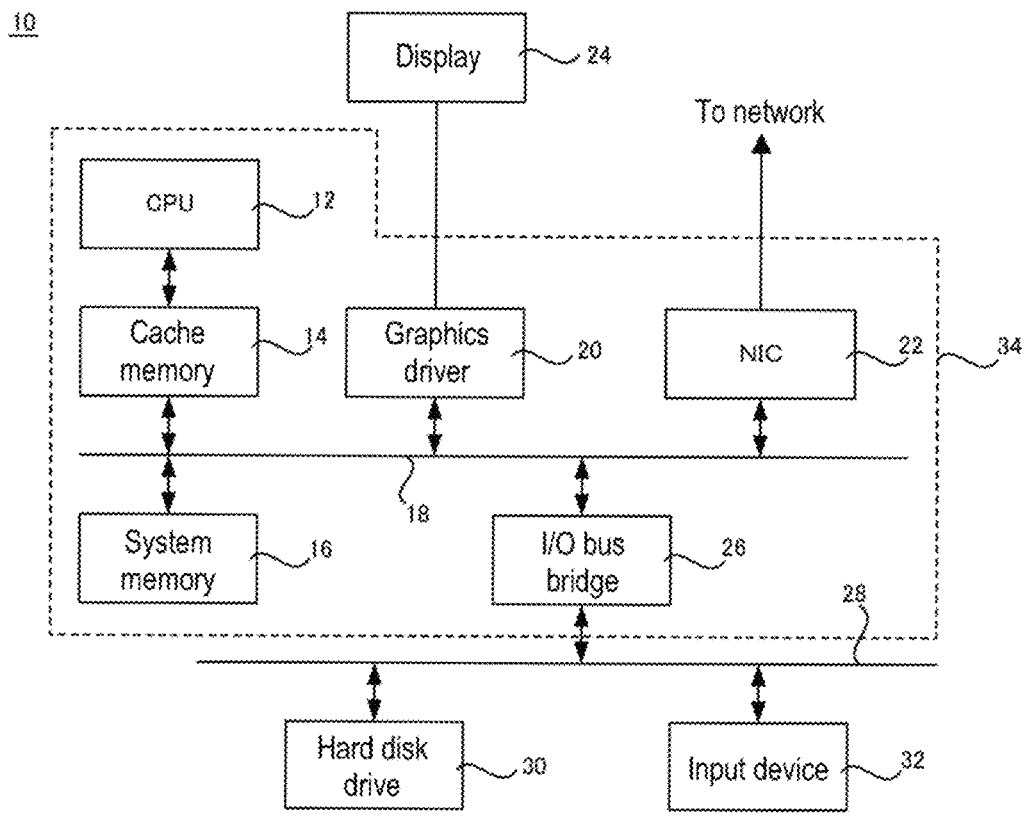
FIG. 14 is a schematic hardware configuration diagram showing a computer apparatus implementing the speech recognition system according to the embodiment of the present invention.

A computer apparatus which implements the speech recognition system according to the above embodiment will be described below. FIG. 14 shows a schematic hardware configuration of a computer apparatus 10 which implements the speech recognition system 100 according to the present embodiment. The computer apparatus shown in FIG. 14 includes a central processing unit (CPU) 12, a cache memory 14 having a level such as L1 and L2 which enables fast access to the data used by the CPU 12, and a system memory 16 made up of a solid state memory device such as DRAM used by the CPU 12 in performing processes.

The CPU 12, cache memory 14, and system memory 16 are connected to other devices or drivers such as a graphics driver 20 and network interface card (NIC) 22 via a system bus 18. The graphics driver 20 is connected to an external display 24 through a bus and can display processing results of the CPU 12 on a display screen. Also, the NIC 22 connects the computer apparatus 10 at a physical layer level and data link layer level to a network which uses an appropriate communication protocol such as TCP/IP.

The system bus 18 is further connected with an I/O bus bridge 26. A hard disk drive 30 is connected on the downstream side of the I/O bus bridge 26 through an I/O bus 28 such as PCI via IDE, ATA, ATAPI, serial ATA, SCSI, or USB. Also, input devices 32 such as a keyboard and a mouse or another pointing device are connected to the I/O bus 28 through a bus such as USB, providing a user interface. The I/O bus 28 may be further connected with a recording device such as a microphone.

Any single core processor or multi-core processor can be used as the CPU 12 of the computer apparatus. The computer apparatus is controlled by an operating system (hereinafter referred to as an OS) such as WINDOWS® 200X, UNIX®, LINUX®. Under the management of the OS described above, the computer apparatus loads a program into the system memory 16 or the like, executes the program, controls operation of hardware resources, and thereby implements the configurations and processes of the above-described functional parts on the computer.

An original language model and original acoustic model were constructed by a usual method using a personal computer. Furthermore, the original language model and original acoustic model were integrated by the speech recognition system construction process according to the above embodiment, thereby constructing a language model and acoustic model containing the overlap word and overlap phoneme, respectively.

Training Data

As training data, a set (150 hours) of an actual voice call recording in stereo sound and manual transcripts of the respective channels was prepared. Incidentally, the voice and transcripts were in Japanese. For training of the acoustic model, synthesized monaural sound was created by combining the voices on the channels of the stereo sound. 16-bit speech data was prepared at a sampling rate of 8 kHz, and acoustic analysis was conducted using a time window with a 25-msec frame length and a frame period of 10 msec. A PLP-based feature vector with a total of 13 dimensions was calculated on a frame by frame basis.

Language Model Construction

The language model was a word 3-gram. The smoothing algorithm used was the Modified Kneser-Ney algorithm. The original language model 142 was trained using the transcripts of the respective channels of the stereo sound 112 provided as training data. Also, the transcript-attached stereo sound 112 provided as training data was aligned forcefully, transcribed portions overlapping on the time axis were discriminated, all the detected portions were replaced with the overlap words, and a language model transcript 134 corresponding to the synthesized monaural sound was created. The overlap-word-containing language model 138 was trained using the language model transcript 134 as training data. The original language model 142 and overlap-word-containing language model 138 were integrated with each other at a weight ratio of 8:2 between the original language model 142 and overlap-word-containing language model 138 and a final language model 106 was obtained.

Acoustic Model Construction

The acoustic model was constructed as an HMM-GMM system. The original acoustic model 162 was trained using the sound and transcript on each channel of stereo sound provided as training data. Each phoneme was modeled using a tristate left-to-right HMM and a triphone model which takes the left and right phoneme contexts into consideration were trained. In so doing, based on a decision tree algorithm, by sharing states among groups of triphones similar in acoustic characteristics, a model having 4,500 states and a Gaussian number of 150000 was trained. Note that discriminative training (bMMI criteria) of feature space was conducted, that discriminative training (bMMI criteria) of an acoustic model was conducted to train the acoustic model, and that MLLR (Maximum Likelihood Linear Regression) adaptation was performed.

To train the overlap phoneme acoustic model 160, the transcript-attached stereo sound provided as training data was aligned forcefully, transcribed portions overlapping on the time axis were discriminated, the SNR was calculated by setting the larger of the detected voices as a signal, and the smaller voice as a noise, any portion whose SNR was less than 10 dB was replaced with the overlap word, and an acoustic model transcript 156 containing the overlap words corresponding to the synthesized monaural sound was created. In so doing, in a portion where the SNR was equal to or larger than 10 dB, the larger voice was included in the transcript. Then, that part of the synthesized monaural sound which was aligned with the overlap word in the acoustic model transcript 156 was set as training data, associated with a newly defined overlap phoneme, and consequently the overlap phoneme acoustic model 160 was created. The overlap phoneme was also modeled using a tristate left-to-right HMM. Note that the overlap phoneme was handled as a monophone. Then, the original acoustic model 162 and overlap phoneme acoustic model 160 were integrated with each other to obtain an acoustic model (primary) 166.

Furthermore, using all the training data including the transcript-attached stereo sound and transcript-attached monaural sound and using the created acoustic model (primary) as an initial value, multi-condition training was conducted to obtain a final acoustic model (secondary).

Speech Recognition Results

Speech recognition of the monaural sound of actual telephone speech was performed using the original language model 142, original acoustic model 162, language model 106, acoustic model (primary) 166, and acoustic model (secondary) 108, the character error rate (CER) of the speech recognition was determined, and the number of substitution errors, number of insertion errors, and number of deletion errors were counted. Results of the speech recognition experiment are shown in Table 1 below. In Table 1 below, the standard technique corresponds to speech recognition using original language model 142 and original acoustic model 162.

TABLE 1

| Acoustic model | Language model | CER[%] | CER relative improvement rate (%) | Number of substitution errors | Number of insertion errors | Number of deletion errors |
|---|---|---|---|---|---|---|
| Standard technique (HMM-GMM) | Standard technique (3-gram) | 31.835 | Baseline | 2591 | 573 | 1517 |
| Acoustic model (primary) according to embodiment | Language model according to embodiment (3-gram) | 31.228 | 1.91 | 2501 | 551 | 1531 |
| Acoustic model (secondary) according to embodiment | Language model according to embodiment (3-gram) | 30.931 | 2.84 | 2406 | 526 | 1612 |

As can be seen from Table 1, the CER was improved significantly when the language model 106 and acoustic model 166 or 108 according to the present embodiment were used, even in the case of the acoustic model (primary) 166, compared to when the standard technique was used. Looking at relative improvement rates of CER calculated using the CER of the standard technique as a baseline, it can be seen that the CER was improved a little less than 2% when the acoustic model (primary) 166 was used and that the CER was improved a little less than 3% when the acoustic model (secondary) 108 was used. Looking at the number of substitution errors, number of insertion errors, and number of deletion errors, it can be seen that although the number of deletion errors increased slightly, the number of substitution errors and number of insertion errors were reduced greatly with the CER being improved as a whole. It is believed that this is because any simultaneous speech segment contained as a burst error in a substitution error and insertion error was absorbed suitably in a garbage model. Incidentally, it is believed that the reason why the CER was improved more when the acoustic model (secondary) 108 was used than when the acoustic model (primary) 166 was used is that multi-condition training allowed simultaneous speech segments to be contained as small noises in the training data used to train acoustic models of regular phonemes.

As discussed above, the embodiment of the present invention can provide a construction method, computer system, program, and recording medium which can efficiently construct a speech recognition model capable of discriminating simultaneous speech segments in mixed speakers' speech in which voices of plural speakers are mixed. Furthermore, the embodiment of the present invention can provide a speech recognition method, speech recognition apparatus, and program which use the speech recognition model capable of discriminating simultaneous speech segments in mixed speakers' speech.

Note that, although functional parts of the present invention and processes of the functional parts have been described to facilitate understanding of the invention, the present invention not only makes the specific functional parts perform specific processes but also can assign the processes described above to any functional part, giving consideration to processing efficiency as well as efficiency of programming and the like in implementation.

In addition to Japanese and English illustrated above by example, the present invention is suitably applied to languages other than those described above, including Chinese, Arabic, German, French, Russian, Korean, and the like.

The functions of the present invention can be implemented by machine-executable programs described in an object oriented programming language such as C++, Java®, Java® Beans, Java® Applet, JavaScript®, Perl, Python, or Ruby and can be distributed by being stored in a machine-readable recording medium or distributed by transmission.

Whereas the present invention has been described with reference to specific embodiments so far, the present invention is not limited to the embodiments and can be changed by way of other embodiments, additions, modifications, deletions, or the like to the extent those skilled in the art can think of, and any resulting form is included in the scope of the present invention as long as the operations and effects of the present invention are achieved.

Reference Signs List

100 . . . speech recognition system, 102 . . . speech analyzing section, 104 . . . speech recognizing section, 106 . . . language model, 108 . . . acoustic model, 110 . . . dictionary, 112 . . . transcript-attached stereo sound, 120 . . . speech recognition model construction section, 122 . . . alignment section, 124 . . . speech synthesizing section, 126 . . . synthesized monaural sound, 128 . . . transcript-attached synthesized monaural sound, 130 . . . language model construction section, 132 . . . language model monaural sound transcription section, 134 . . . language model monaural sound transcript, 136 . . . overlap-word-containing language model training section, 138 . . . overlap-word-containing language model, 140 . . . language model integration section, 142 . . . original language model, 150, 250 . . . acoustic model construction section, 152, 252 . . . acoustic model monaural sound transcription section, 154, 254 . . . threshold, 156, 256 . . . acoustic model monaural sound transcript, 158 . . . overlap phoneme acoustic model training section, 160 . . . overlap phoneme acoustic model, 162 . . . original acoustic model, 164 . . . acoustic model integration section, 166 . . . acoustic model (primary), 168 . . . acoustic model improvement section, 258 . . . overlap-phoneme-containing acoustic model training section, 12 . . . CPU, 14 . . . cache memory, 16 . . . system memory, 18 . . . system bus, 20 . . . graphics driver, 22 . . . NIC, 24 . . . display, 26 . . . I/O bus bridge, 28 . . . I/O bus, 30 . . . hard disk drive, 32 . . . input device

What is claimed is:

1. A construction method for a speech recognition model, comprising the steps, executed by a computer system, of:
    acquiring alignment between speech of each of a plurality of speakers and a transcript of the speaker;
    automatically joining transcripts of the respective ones of the plurality of speakers along a time axis, creating a transcript of speech of mixed speakers obtained from synthesized speech of the speakers, and replacing predetermined transcribed portions of the plurality of speakers overlapping on the time axis with a unit which represents a simultaneous speech segment; and
    constructing at least one of an acoustic model and a language model which make up a speech recognition model, based on the transcript of the speech of the mixed speakers.

2. The construction method according to claim 1, wherein the constructing step comprises a step, executed by the computer system, of defining an acoustic unit associated with a unit which represents the simultaneous speech segment and configured to represent the simultaneous speech segment, and constructing the acoustic model which makes up the speech recognition model and contains the acoustic unit.

3. The construction method according to claim 2, wherein the step of constructing the acoustic model comprises the steps, executed by the computer system, of:
    training an acoustic model of the acoustic unit configured to represent the simultaneous speech segment from a portion of the speech of the mixed speakers which is aligned with the unit which represents the simultaneous speech segment; and
    forming the acoustic model which makes up the speech recognition model, by combining the acoustic model of the acoustic unit configured to represent the simultaneous speech segment with an acoustic model of another acoustic unit.

4. The construction method according to claim 3, wherein the step of constructing the acoustic model further comprises:
    a step, executed by the computer system, of improving the acoustic model which makes up the speech recognition model by further conducting training using one or more sets of the speech of each speaker and the transcript of the speaker as well as one or more sets of the speech of the mixed speakers and a transcript of the speech of the mixed speakers.

5. The construction method according to claim 2, wherein the step of constructing the acoustic model is a step of training acoustic models of a plurality of acoustic units including the acoustic unit configured to represent the simultaneous speech segment using one or more sets of the speech of each speaker and the transcript of the speaker as well as one or more sets of the speech of the mixed speakers and a transcript of the speech of the mixed speakers.

6. The construction method according to claim 1, wherein the step of constructing at least one of an acoustic model and a language model comprises:
    a step, executed by the computer system, of training a language model which contains, as a language unit, the unit which represents the simultaneous speech segment, based on the transcript of the speech of the mixed speakers.

7. The construction method according to claim 6, wherein the step of constructing at least one of an acoustic model and a language model further comprises the steps, executed by the computer system, of:
  determining weighting for use in uniting a language model containing the language unit which represents the simultaneous speech segment with another language model; and
  forming a language model which makes up the speech recognition model by uniting the language model containing the language unit which represents the simultaneous speech segment with the other language model based on the weighting.

8. The construction method according to claim 1, wherein the creating step includes a step of creating an acoustic model transcript of the speech of the mixed speakers and a step of creating a language model transcript of the speech of the mixed speakers; and the step of creating the acoustic model transcript of the speech of the mixed speakers comprises the steps, executed by the computer system, of:
  determining which speaker is dominant in predetermined transcribed portions of the plurality of speakers overlapping on the time axis, and
  adopting, in response to determining that any speaker is dominant, a transcribed portion corresponding to the speaker determined to be dominant instead of replacement with the unit which represents the simultaneous speech segment.

9. The construction method according to claim 1, further comprising a step, executed by the computer, of forming a language model configured to contain a language unit which represents the simultaneous speech segment and make up the speech recognition model, assuming that simultaneous speech occurs according to a predetermined rule.

10. The construction method according to claim 1, wherein the language model is one of an n-gram model and a neural network model and the acoustic model is one of an HMM-GMM and an HMM-DNN.

11. A speech recognition method for outputting speech recognition results while discriminating a simultaneous speech segment in input speech based on the speech recognition model constructed by the construction method according to claim 1.

12. A non-transitory computer readable storage medium comprising a computer readable program for constructing a speech recognition model, being configured to cause a computer to execute all the steps of the method according to claim 1.

13. A speech recognition apparatus for performing speech recognition based on a speech recognition model, the speech recognition model being constructed by the computer system according to claim 12, comprising:
  an input section adapted to accept input of speech to be recognized; and
  a speech recognition section adapted to output recognition results while discriminating a simultaneous speech segment in the speech to be recognized, based on the speech recognition model.

14. A computer system for constructing a speech recognition model, comprising:
  a processor and a memory coupled to the processor;
    an alignment acquisition section adapted to acquire alignment between speech of each of a plurality of speakers and a transcript of the speaker;
    a speech synthesizing section adapted to combine the speech of the speakers and thereby generate speech of mixed speakers;
    a transcription section adapted to automatically join the transcripts of the respective ones of the plurality of speakers along a time axis, create a transcript of speech of the mixed speakers, and replace predetermined transcribed portions overlapping among plural speakers on the time axis with a unit which represents a simultaneous speech segment using the processor and the memory;
    a language model construction section adapted to construct a language model making up a speech recognition model; and
    an acoustic model construction section adapted to construct an acoustic model making up the speech recognition model, based on the speech of the mixed speakers as well as on the transcript of the speech of the mixed speakers.

15. The computer system according to claim 14, wherein the acoustic model construction section defines an acoustic unit associated with a unit which represents the simultaneous speech segment and configured to represent the simultaneous speech segment and constructs the acoustic model which makes up the speech recognition model while training an acoustic model containing at least the acoustic unit.

16. The computer system according to claim 14, wherein, based on the transcript of the speech of the mixed speakers, the language model construction section constructs the language model which makes up the speech recognition model while training a language model which contains, as a language unit, the unit which represents the simultaneous speech segment.

17. A speech recognition apparatus for performing speech recognition based on a speech recognition model, comprising:
  a language model configured to make up the speech recognition model, contain a language unit representing a simultaneous speech segment, and model a probability concerning a chain of language units including a language unit which represents the simultaneous speech segment;
  an acoustic model configured to make up the speech recognition model, contain an acoustic unit associated with the language unit which represents the simultaneous speech segment and configured to represent the simultaneous speech segment, and model the probability of outputting predetermined speech on condition that the language unit representing the simultaneous speech segment is given;
  an input section adapted to accept input of speech to be recognized; and
  a speech recognition section adapted to automatically output recognition results while discriminating a simultaneous speech segment in the speech to be recognized, based on the speech recognition model.

18. A non-transitory computer readable storage medium comprising a computer readable program for constructing a speech recognition model configured to cause a computer to function as:
  an alignment acquisition section adapted to acquire alignment between speech of each of a plurality of speakers and a transcript of the speaker;
  a speech synthesizing section adapted to combine the speech of the speakers and thereby generate speech of mixed speakers;
  a transcription section adapted to automatically join the transcripts of the respective ones of the plurality of speakers along a time axis, create a transcript of speech of the mixed speakers, and replace predetermined transcribed portions overlapping among plural speakers on the time axis with a unit which represents a simultaneous speech segment;

a language model construction section adapted to construct a language model making up a speech recognition model; and an acoustic model construction section adapted to construct an acoustic model making up the speech recognition model, based on the speech of the mixed speakers as well as on the transcript of the speech of the mixed speakers.

19. A non-transitory computer readable storage medium comprising a computer readable program for performing speech recognition based on a speech recognition model configured to cause a computer to function as:

a language model configured to make up the speech recognition model, contain a language unit representing a simultaneous speech segment, and model a probability concerning a chain of language units including a language unit which represents the simultaneous speech segment;

an acoustic model configured to make up the speech recognition model, contain an acoustic unit associated with the language unit which represents the simultaneous speech segment and configured to represent the simultaneous speech segment, and model the probability of outputting predetermined speech on condition that the language unit representing the simultaneous speech segment is given;

an input section adapted to accept input of speech to be recognized; and a speech recognition section adapted to automatically output recognition results while discriminating a simultaneous speech segment in the speech to be recognized, based on the speech recognition model.

* * * * *